United States Patent
Kirby

(10) Patent No.: US 11,583,965 B2
(45) Date of Patent: Feb. 21, 2023

(54) STATIC FLEXIBLE TOOLING SYSTEM

(71) Applicant: Advanced Machine Works, LLC, Tulsa, OK (US)

(72) Inventor: Larry Don Kirby, Edmond, OK (US)

(73) Assignee: ADVANCED MACHINE WORKS, LLC, Tulsa, OK (US)

(*) Notice: Subject to any disclaimer, the term of this patent is extended or adjusted under 35 U.S.C. 154(b) by 718 days.

(21) Appl. No.: 16/378,702

(22) Filed: Apr. 9, 2019

(65) Prior Publication Data
US 2019/0314940 A1   Oct. 17, 2019

Related U.S. Application Data

(60) Provisional application No. 62/656,795, filed on Apr. 12, 2018.

(51) Int. Cl.
| | | |
|---|---|---|
| *B23Q 1/03* | (2006.01) | |
| *B25B 11/00* | (2006.01) | |
| *B25B 5/14* | (2006.01) | |
| *B28B 7/02* | (2006.01) | |

(52) U.S. Cl.
CPC ............ *B23Q 1/035* (2013.01); *B23Q 1/032* (2013.01); *B25B 5/14* (2013.01); *B25B 11/005* (2013.01); *B28B 7/025* (2013.01)

(58) Field of Classification Search
CPC ...... B23Q 1/035; B23Q 1/032; B23Q 1/5462; B23Q 15/00; B25B 11/00; B25B 11/005; B25B 5/14
USPC .......................................................... 269/21
See application file for complete search history.

(56) References Cited

U.S. PATENT DOCUMENTS

| | | | |
|---|---|---|---|
| 4,088,312 A | 5/1978 | Frosch et al. | |
| 4,200,272 A | 4/1980 | Godding | |
| 4,491,306 A * | 1/1985 | Eickhorst | B25B 11/005 |
| | | | 269/21 |
| 4,527,783 A | 7/1985 | Collora et al. | |
| 4,684,113 A | 8/1987 | Douglas et al. | |
| 4,723,766 A | 2/1988 | Beeding | |
| 4,838,531 A | 6/1989 | Corsi | |

(Continued)

FOREIGN PATENT DOCUMENTS

| | | |
|---|---|---|
| JP | 2010051980 A | 3/2010 |
| WO | 2004113015 A2 | 12/2004 |

OTHER PUBLICATIONS

Korean Intellectual Property Office, "PCT International Search Report", dated Jul. 26, 2019, 3 pages, Republic of Korea.

(Continued)

*Primary Examiner* — Seahee Hong
(74) *Attorney, Agent, or Firm* — Tomlinson McKinstry, P.C.

(57) ABSTRACT

A system for supporting workpieces during machining. The system comprises one or more adjustable workpiece support assemblies and a robotic unit. Each workpiece support assembly comprises a pedestal and a rotatable fixture element. The robotic assembly comprises means of mobilizing and immobilizing each support assembly, so that the fixture element may be secured in a particular orientation. The robotic unit moves along a frame, and manipulates and fixes the position of the fixture elements to match the contour of a workpiece. Vacuum forces may be applied through the workpiece support assemblies to secure the workpiece against the fixture elements.

10 Claims, 33 Drawing Sheets

(56) References Cited

U.S. PATENT DOCUMENTS

| | | | |
|---|---|---|---|
| 5,026,033 A * | 6/1991 | Roxy | B23Q 3/103 |
| | | | 269/45 |
| 5,121,907 A | 6/1992 | Engwall | |
| 5,163,793 A | 11/1992 | Martinez | |
| 5,305,992 A * | 4/1994 | Kish | B23Q 1/035 |
| | | | 269/274 |
| 5,372,357 A | 12/1994 | Blaimschein | |
| 5,544,968 A * | 8/1996 | Goellner | B23Q 1/5462 |
| | | | 248/181.1 |
| 5,590,870 A | 1/1997 | Goellner | |
| 5,722,646 A | 3/1998 | Soderberg et al. | |
| 6,032,348 A | 3/2000 | Haas et al. | |
| 6,209,188 B1 | 4/2001 | Soderberg et al. | |
| 6,454,333 B2 | 9/2002 | Portal | |
| 6,625,866 B2 | 9/2003 | Stone et al. | |
| 7,444,742 B2 | 11/2008 | Sturm, Jr. et al. | |
| 7,584,947 B2 | 9/2009 | Freeland | |
| 7,866,642 B2 | 1/2011 | McAllister | |
| 7,918,440 B2 | 4/2011 | Schiavi et al. | |
| 8,079,578 B2 | 12/2011 | Bumgarner et al. | |
| 8,322,700 B2 | 12/2012 | Saberton et al. | |
| 8,469,344 B2 | 6/2013 | Halford | |
| 8,469,345 B2 | 6/2013 | Samac et al. | |
| 8,695,958 B2 | 4/2014 | Marrinan et al. | |
| 8,944,423 B2 | 2/2015 | Marrinan et al. | |
| 2007/0020065 A1 * | 1/2007 | Kirby | B23Q 1/035 |
| | | | 414/1 |
| 2007/0022006 A1 | 1/2007 | Kirby | |
| 2008/0127474 A1 | 6/2008 | McAllister | |
| 2014/0199153 A1 | 7/2014 | Reinhold et al. | |

OTHER PUBLICATIONS

Korean Intellectual Property Office, "PCT Written Opinion of the International Searching Authority", dated Jul. 26, 2019, 6 pages, Republic of Korea.

European Patent Office, "Supplementary European Search Report", dated Mar. 14, 2022, 6 pages, Munich, Germany.

* cited by examiner

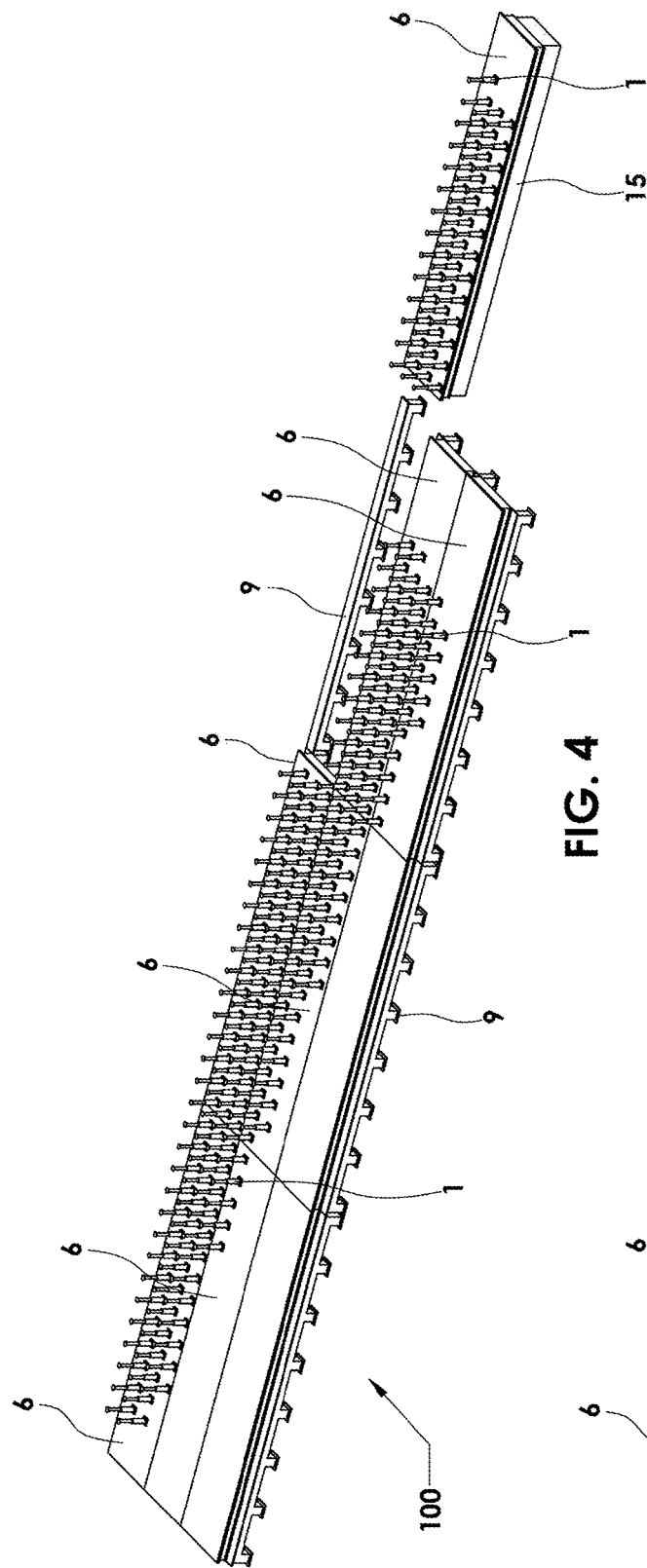
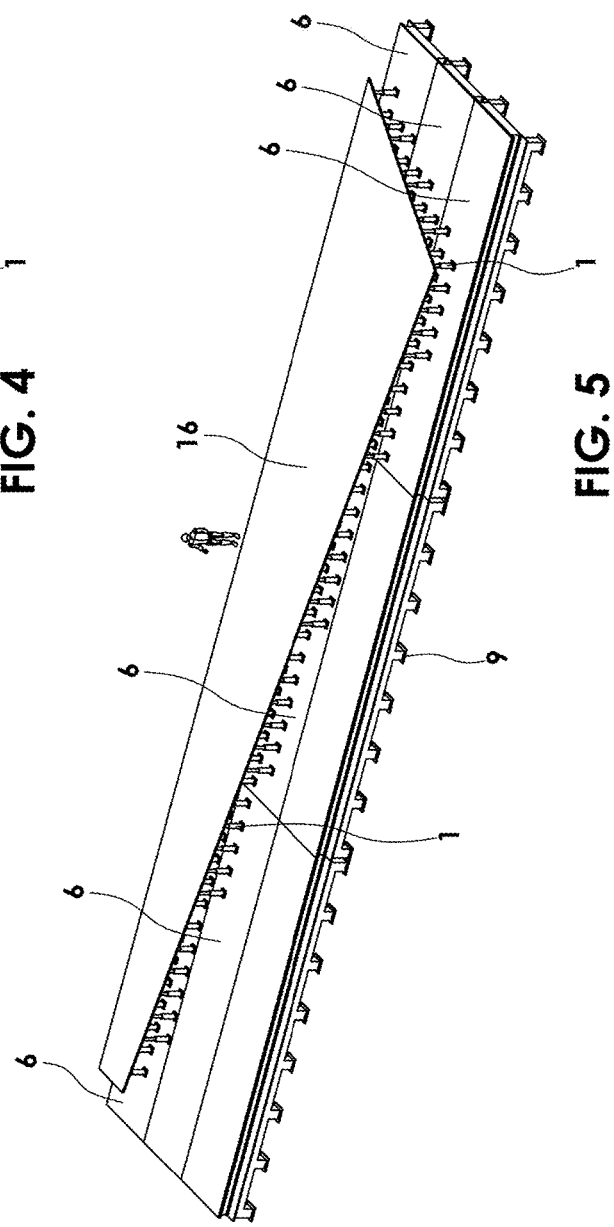
FIG. 4
FIG. 5

STATIC FLEXIBLE TOOLING SYSTEM

BACKGROUND

Universal fixtures, or flexible tooling, for holding and supporting contoured workpieces during machining operations have been disclosed in U.S. Pat. Nos. 4,684,113 and 5,722,646. In the case of U.S. Pat. No. 4,684,113 multiple workpiece engaging rods are actuated by motor driven screws, while with U.S. Pat. No. 5,722,646 multiple workpiece engaging rods are actuated fluidically. Substantially all universal tooling systems utilized in the aerospace industry for holding contoured workpieces are based on one of these types of active systems.

While these types of active flexible tooling systems addressed certain problems associated with non-universal tooling, in many cases they have proven unreliable, particularly in wet environments such as waterjet cutting of composite workpieces. Common malfunctions include complete operational failure of individual actuators, which may be visually apparent and can be addressed by replacing the malfunctioning actuator. Even greater complications may occur when actuators misposition with amounts too small for visual detection, resulting in workpieces being machined out of tolerance.

Most known flexible tooling systems utilize workpiece engaging end effectors which pivot freely, making position detection and verification by automated methods impossible. The resulting conundrum is that these systems may not always position properly, and there is no good way to tell if that has happened.

The present invention utilizes configurable workpiece support assemblies that are designed to provide accurate and verifiable support of workpieces. Exposure to water, even for extended periods of time will have no effect on the performance of the present invention since the workpiece support assemblies contain no electronic components, motors or valves. The present invention incorporates fully immobilized fixture elements, allowing automated position verification and qualification to be performed with known devices including spindle probes, coordinate measuring machines and laser scanning systems.

SUMMARY

The invention is directed to a workpiece support assembly. The assembly comprises a pedestal, a support tube, an offset arm, and a fixture element. The support tube is carried by the pedestal and has a longitudinal axis. The offset arm is carried by the support tube and selectively rotatable about the longitudinal axis. The arm has a rectilinear channel formed therein. The fixture element is supported above the channel and movable along a line parallel thereto. The fixture element has at least two degrees of rotational freedom.

In another aspect, the invention is directed to a system. The system comprises a plurality of unpowered support assemblies and a robotic unit. Each support assembly has a fixture element that has at least five selectable degrees of kinematic freedom. The robotic unit is positionable in operative engagement with each of the plurality of support assemblies. The robotic unit carries one or more installation elements collectively having at least five degrees of kinematic freedom.

BRIEF DESCRIPTION OF THE DRAWINGS

FIG. 4 is a perspective view showing a plurality of workpiece holding pallets each loaded with a plurality of workpiece supports.

FIG. 5 is a perspective view showing a plurality of workpiece holding pallets shown in FIG. 4 abutted together for holding a large workpiece such as an aerospace wing skin.

DETAILED DESCRIPTION

The present invention consists of a plurality of workpiece support assemblies which are mounted to a common table structure. Each workpiece support assembly carries a fixture element, together with a means to provide vacuum to hold the workpiece against the fixture element. Each fixture element can be adjusted with up to six degrees of kinematic freedom, and then immobilized rigidly in the desired position with extreme precision. At the heart of the invention are a combination of joints, slides and pivots, which, working in concert, provide an unprecedented freedom of movement, while retaining the capability for the workpiece engaging surface to be immobilized securely in a practically unlimited number of positions.

Prior tooling systems of the types disclosed in U.S. Pat. Nos. 4,684,113 and 5,722,646 are commonly used in the aerospace industry. The workpiece support assemblies in these systems are typically limited to three degrees of kinematic freedom, comprised of the vertical axis, commonly referred to as the Z axis, for the first degree of freedom, and the fixture element which rotates on a ball joint resulting in two additional degrees of kinematic freedom referred to as the AB axes.

The present invention has utility because of its unique combination of simplicity, flexibility, lockability, and automatability. The absence of any one of these characteristics greatly reduces the utility of the invention. Regarding simplicity, complicated systems are inherently less reliable and more costly than simple systems, and if the operating environment is wet the probability of failure is further increased. Regarding flexibility, known flexible tooling systems for contoured workpieces commonly provide three degrees of adjustability, compared to the present invention which provides six degrees of kinematic freedom.

Regarding lockability, the positions and accuracies of known systems with hundreds of workpiece support assemblies that cannot be fully immobilized are practically impossible to verify, which can result in workpieces worth hundreds of thousands of dollars being improperly machined.

Figure 14:
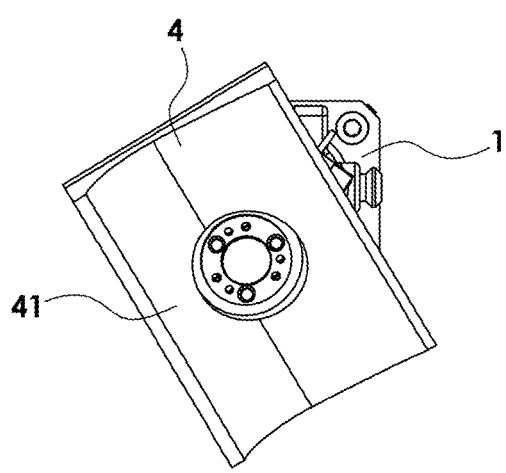
FIG. 14 is a top view of a workpiece support having a contoured fixture element, in a working position.
Figure 16:
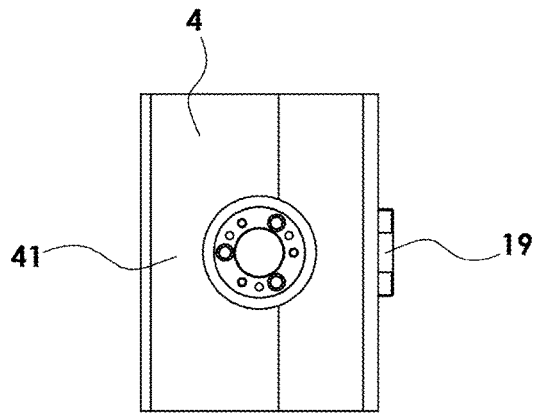
FIG. 16 is a top view of the workpiece support of FIG. 14 in a storage position.
Figure 15:
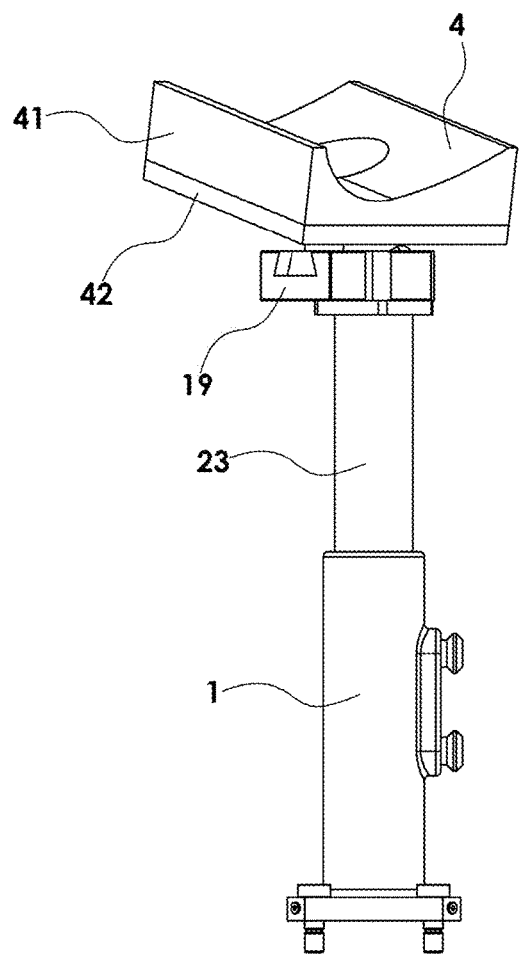
FIG. 15 is a front view of the workpiece support of FIG. 14.
Figure 17:
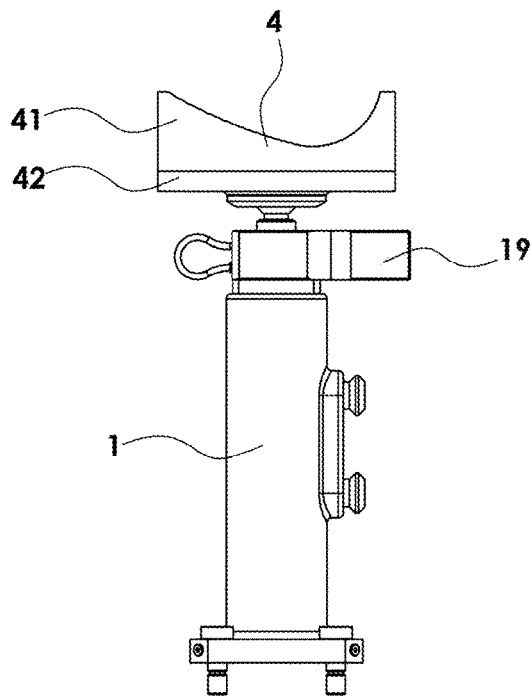
FIG. 17 is a front view of the workpiece support of FIG. 16.

Regarding automatability, an adjustable extension attachment is disclosed in U.S. Pat. No. 5,722,646 with regard to FIGS. 14 and 15 which adds two degrees of adjustability in the XY axes. However, the limitation of this method is that the adjustment has to be performed manually. Manual adjustment has significant disadvantages in a production manufacturing environment, including the amount of time required to manually adjust each attachment, the difficulties of access that occurs when installing attachments in the middle of a large group of workpiece support assemblies, and the probability of human error occurring, including installation of attachments in incorrect locations and inaccurate adjustment of these attachments.

Referring now to the figures, and FIGS. 2-5 in particular, a flexible tooling adjustment cell 100 is shown therein. The cell 100 comprises a stationary framework of columns and beams 8 along which robotic gantry assembly 5 is movably attached. The assembly 5 is further comprised of workpiece holding pallet 6 containing a plurality of movable workpiece supports 1. The pallet 6 and workpiece supports 1 are supported by stationary pallet support rails 9.

Storage pallets 7 may also be used to store the workpiece supports 1. As shown, workpiece supports 1 are in a work position when on the holding pallet 6, and in a storage position when on the storage pallet 7.

One or more workpiece holding pallets 6 and storage pallets 7 may be detached from stationary pallet support rails 9 and moved to and from the cell by material handling vehicles and systems including Automated Guided Vehicles, wheeled transporters, and overhead cranes (not shown).

Figure 1:
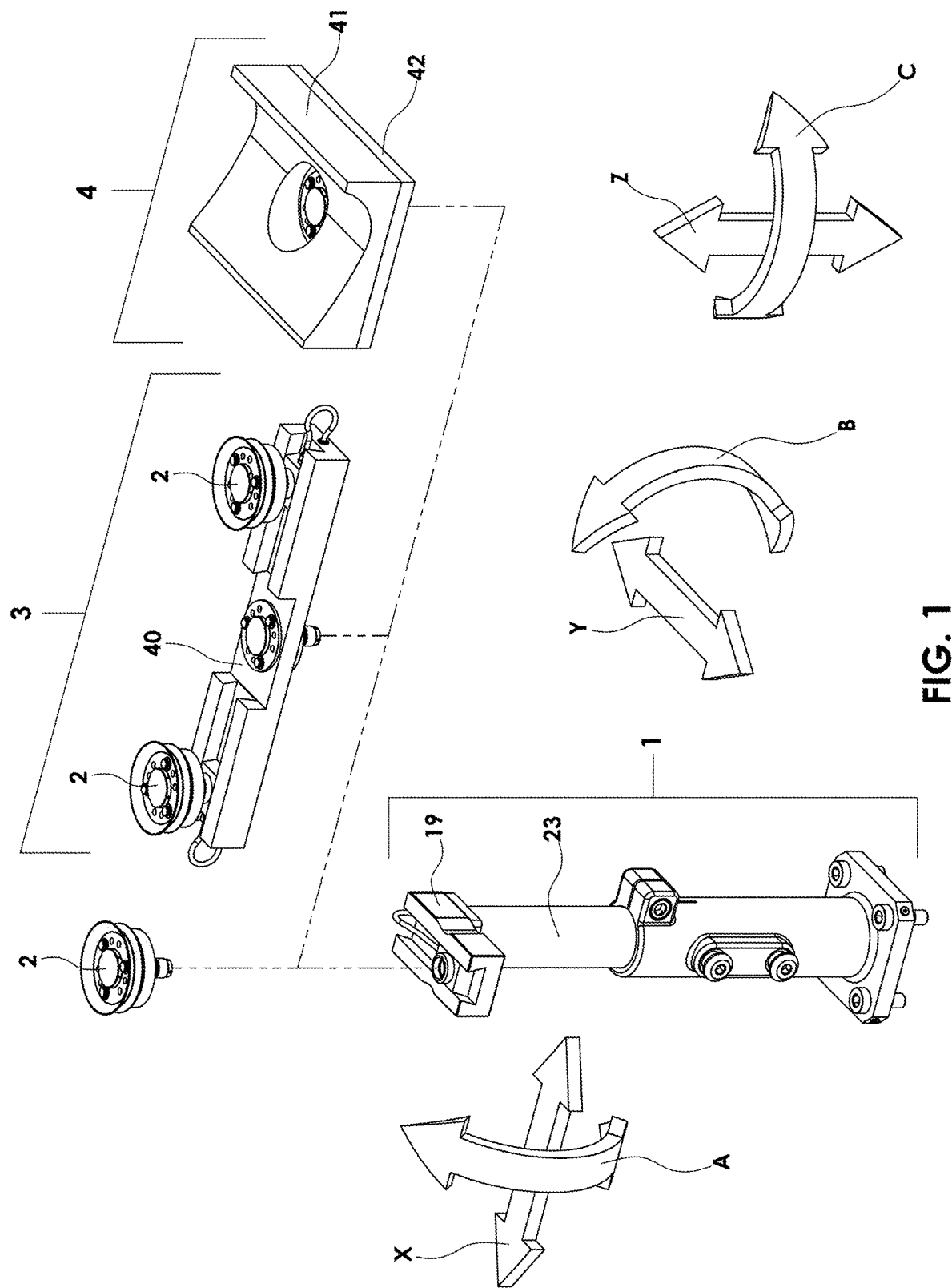
FIG. 1 is a perspective view showing a workpiece support assembly according to the present invention, together with three types of fixture elements which can be attached thereto.

In FIG. 1, the flexible tooling adjustment cell 100 may be configured according to operational needs. When used in conjunction with multiple support assemblies 1, as best shown in FIGS. 4 and 5, the assemblies can support a complicated three-dimensional workpiece.

Figure 6:
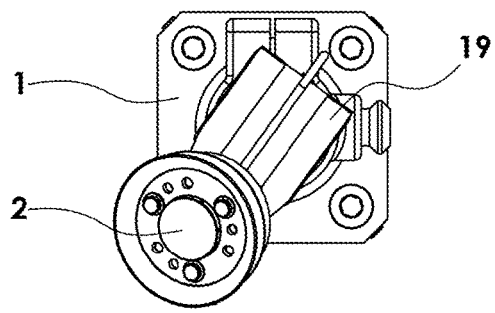
FIG. 6 is a top view of a workpiece support in a working position.
Figure 8:
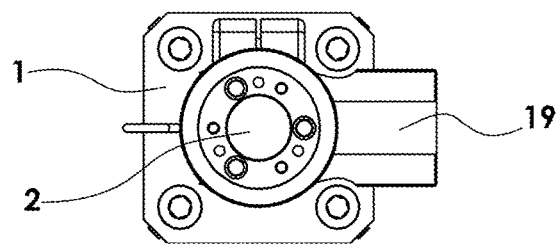
FIG. 8 is a top view of a workpiece support in a storage position.
Figure 9:
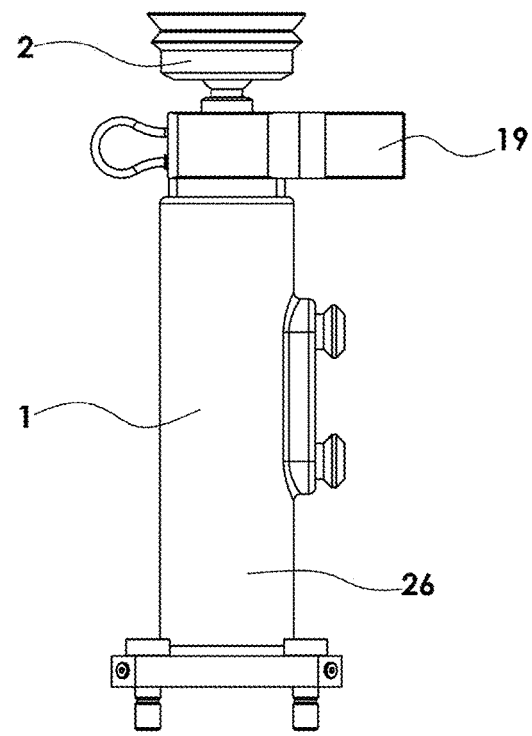
FIG. 9 is a front view of the workpiece support of FIG. 8.
Figure 40:
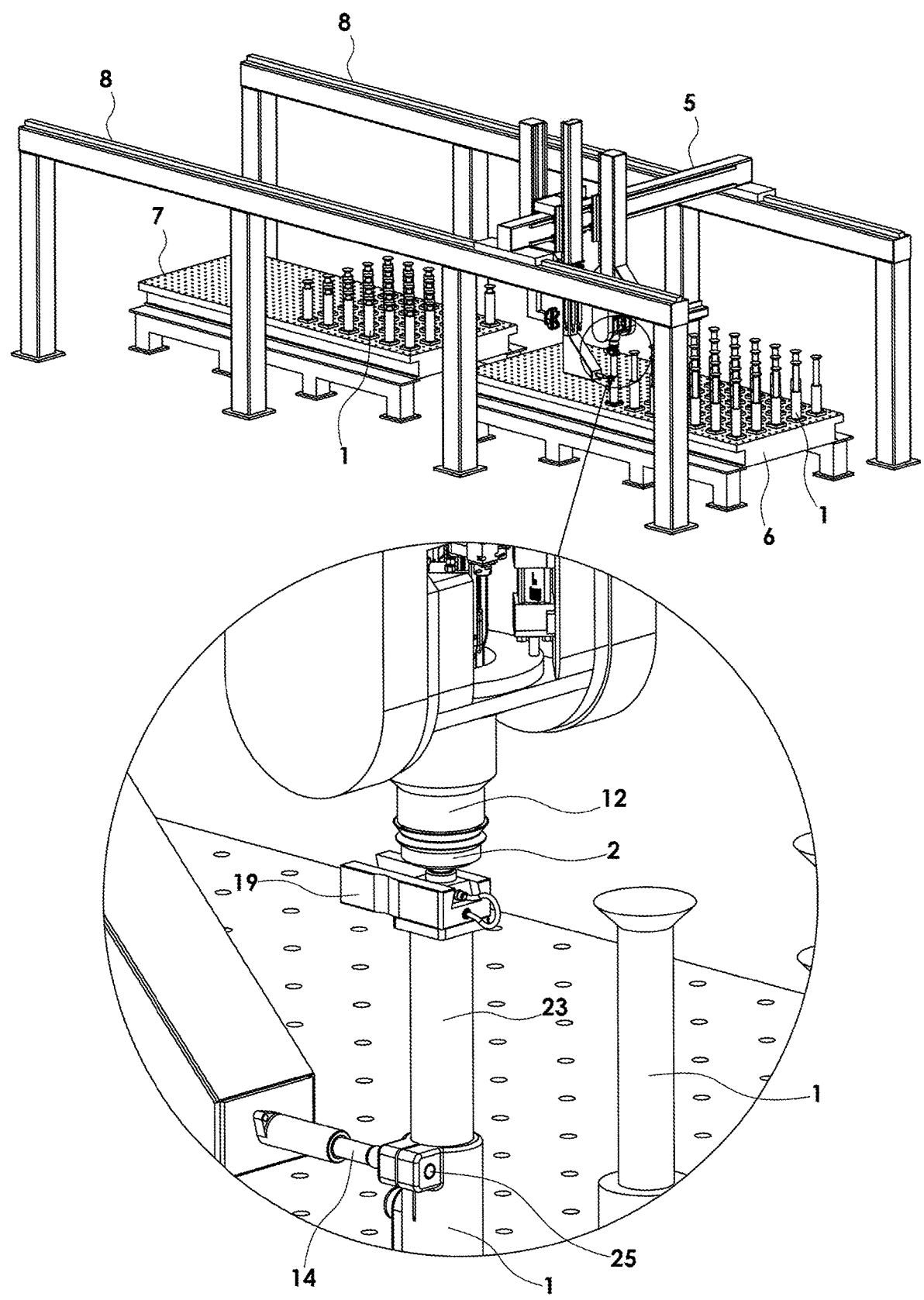
FIG. 40 is a perspective view with associated detail view showing adjustment of the fixture element along the z-axis by the fixture building robot.

The workpiece support 1 may be attached to one or more fixture elements 2, 3, 4 which may be attached thereon. The attachment may be threaded. Workpiece supports 1 in conjunction with fixture elements 2, 3, 4 can be adjusted to a practically unlimited number of working positions, one of which is shown in FIG. 6. Storage positions are shown in FIGS. 8-9. Adjustment positions are shown in FIG. 40.

Fixture element 2 has a round sealing surface and is the preferred support for holding workpieces with gradual contours such as aircraft wing skins. Fixture element 3 is comprised of at least two supports 2 connected with crossbar 40 and is the preferred support for holding contoured workpieces which are predominantly cylindrical such as aircraft nacelle covers. If higher density is desired, a fixture element 3 with three supports 2 may be utilized.

Fixture element 4 is comprised of a contoured workpiece engaging block 41 which is affixed to block attachment plate 42 and is the preferred support for holding sharply contoured aircraft workpieces such as wing leading edges. The block 41 may be dedicated tooling shaped to conform specifically to a feature of the workpiece having a specific contour. The block 41 may be concave, convex, or a combination of concave and convex. The plate 42 may of a number of different sizes and shapes and adapted for attachment to a number of blocks 41 each having a different contour.

It should be understood that workpiece supports 1 can be used in combination with many of the different fixture elements 2, 3, 4. These fixture elements 2,3,4 can be adjusted and immobilized with six degrees of kinematic freedom along linear axes XYZ, and around linear axes XYZ as indicated by corresponding rotary axes ABC, as best shown in FIG. 1. It should be understood that rotary axis A is rotation about the X axis, rotary axis B is rotation about the Y axis, and rotary axis C is rotation about the Z axis.

Each workpiece support 1 comprises a support tube 23 and an offset arm 19. The support tube 23 moves the offset arm (and the fixture elements 2, 3, 4) along the z axis. The offset arm 19 is rotatable about an axis of the support tube 23 to move the fixture elements 2, 3, 4 relative to the X and Y axes.

Figure 2:
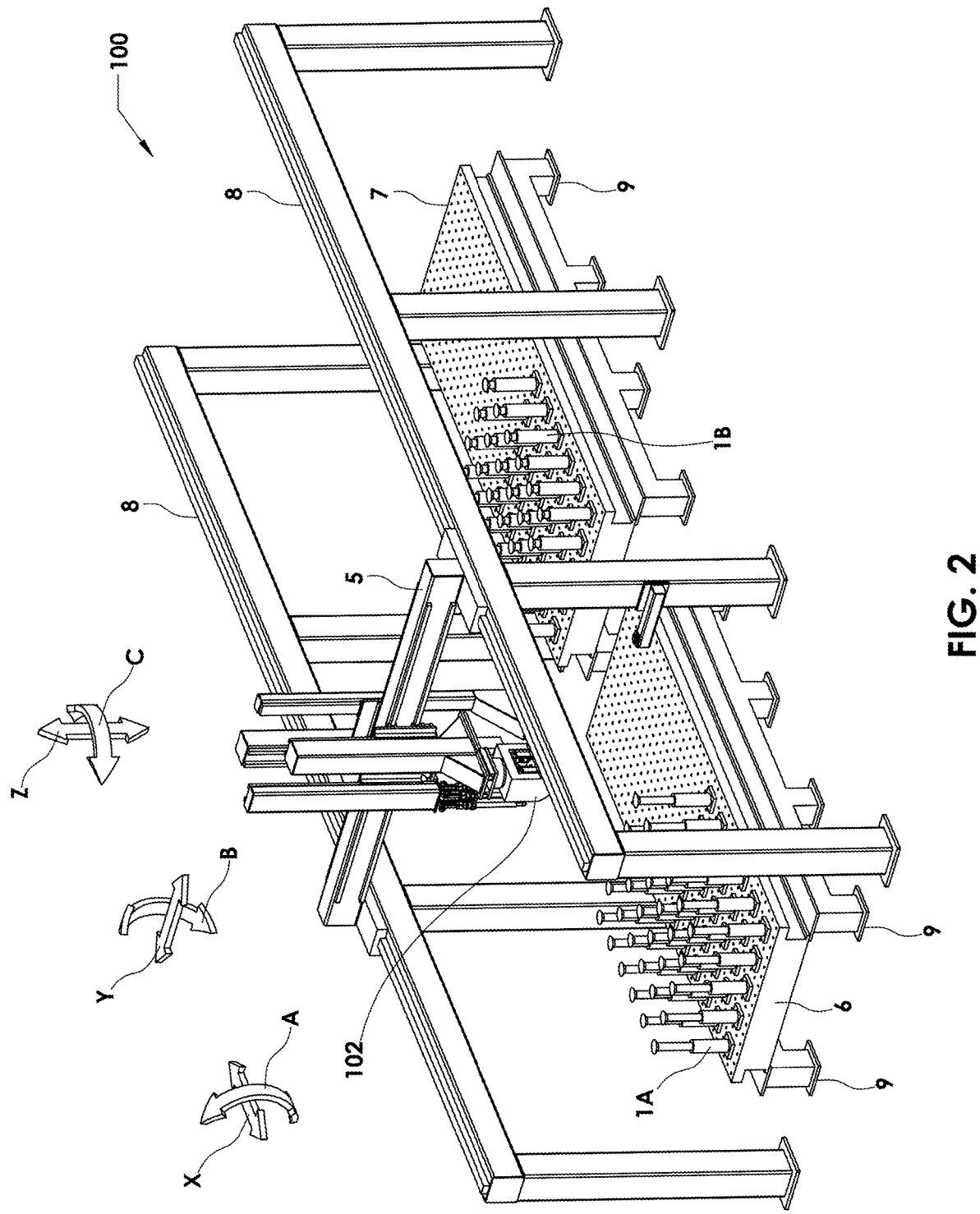
FIG. 2 is a perspective view showing support pallets together with an overhead fixture building robot.
Figure 3:
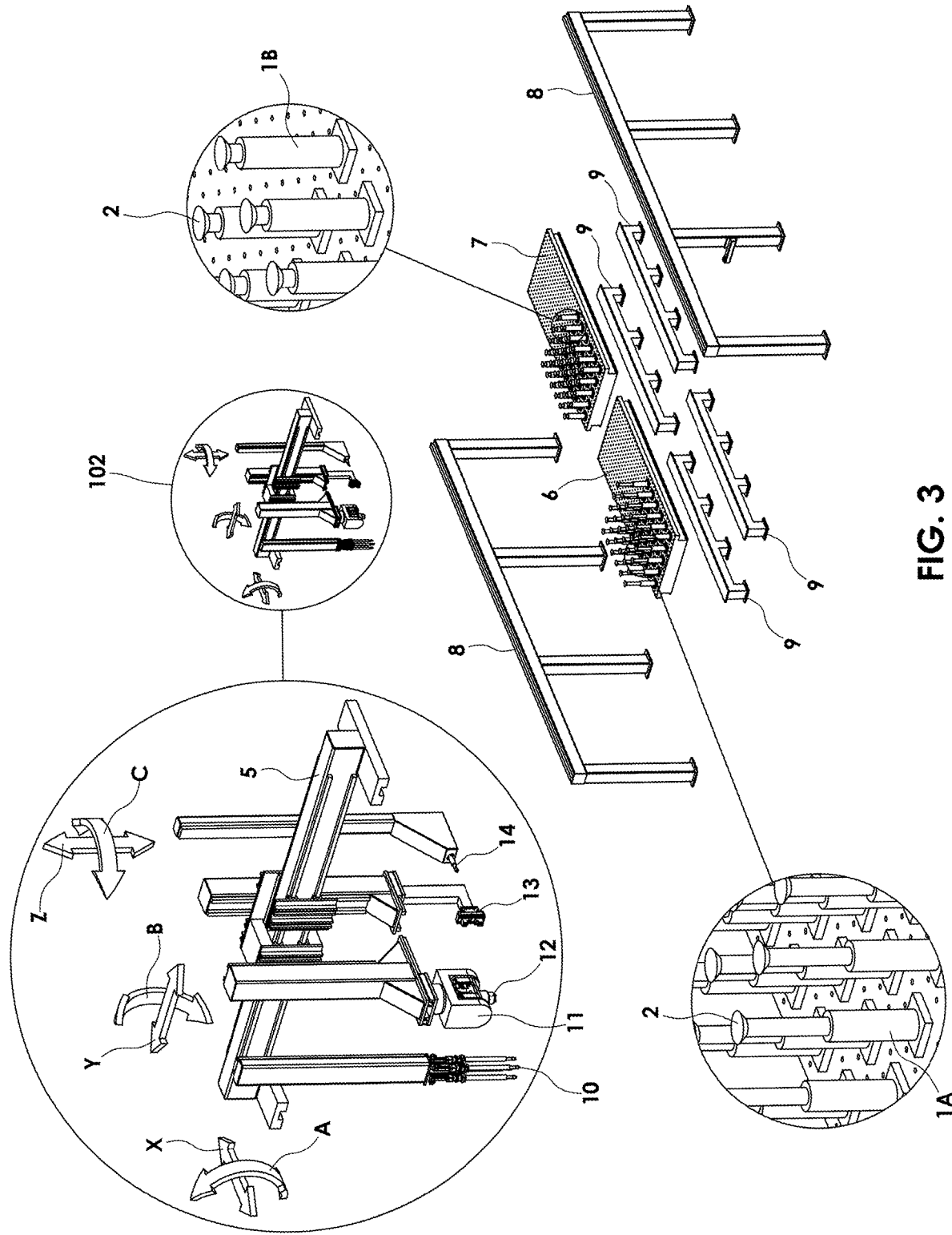
FIG. 3 is an exploded view of FIG. 2 with detail views showing a plurality of workpiece support assemblies together with detail views showing the robotic gantry and robotic end effectors utilized for transporting and adjusting the workpiece support assemblies.

Referring now to FIG. 3 showing an exploded view of FIG. 2 and detail views showing a plurality of workpiece support assemblies 1. The robotic gantry assembly 5 supports a fixture building robot 102. The fixture building robot comprises a number of installation elements collectively having at least the six degrees of kinematic freedom possessed by the fixture elements 2, 3, 4. As shown, the installation elements may comprise a vertical nutrunner assembly 10, a rotating housing 11 supporting an end effector assembly 12, a gripper assembly 13, and a horizontal nutrunner assembly 14. Each of these subassemblies are shown in use in FIGS. 35-46. A nutrunner generally is a torque transmission device on an extendable spindle.

The fixture building robot 102 is controlled such that it can move workpiece supports 1 and corresponding fixture elements 2, 3, 4 along axes XYZ and corresponding rotary axes ABC. These assemblies perform various tasks without human intervention including detaching workpiece supports 1 from their storage position on storage pallet 7 and transporting to workpiece holding pallet 6. Operations further include attaching workpiece support assemblies in storage position to workpiece holding pallet 6, and adjusting and immobilizing workpiece support assemblies to the positions required to hold a large workpiece such as an aerospace wing skin 16 as shown in FIG. 5 for manufacturing operations. A plurality of workpiece supports 1 in working position as required to hold workpieces of varying sizes may thus be detached, transported, attached and adjusted sequentially.

The positions of fixture elements 2, 3, 4 may be individually plotted and placed in a processor, or may be determined by the processor itself to match a particular contoured workpiece. In either case, the workpiece supports 1 are each individually moved by the fixture building robot 102. The workpiece supports 1 contain no internal mechanisms, motors, or electronics capable of moving on its own.

Once manufacturing operations have been completed the fixture building robot 102 may return workpiece support assemblies in working position back to storage position, detach them from workpiece holding pallet 6, transport them back to storage pallet 7 and re-attach them to storage pallet 7. Further details relating to the workpiece support 1 adjustment sequence are provided in FIGS. 40-45.

Referring now to FIGS. 4-5, a plurality of workpiece holding pallets are moved by an automated guided vehicle 15 between stationary pallet support rails 9. Each workpiece holding pallet 6 supports a plurality of workpiece supports 1 in working position that have been previously adjusted and immobilized by the fixture building robot (FIG. 3).

Once pallets 6 are in position, a large contoured workpiece 16 may be held in place for machining operations. These machining operations may include waterjet trimming and drilling. The quantity and arrangement of stationary pallet support rails 9 and workpiece holding pallets 6 can be changed for each installation to accommodate wide and long workpieces as shown which require multiple holding pallets 6 abutted end to end and side to side, or long narrow workpieces which require multiple holding pallets 6 abutted end to end. In addition, smaller workpieces which might fit upon a single holding pallet 6.

With reference to FIGS. 6-9, a workpiece support 1 is shown in its working position and storage position. Each figure shows a fixture element 2. The centerline of the fixture element 2 can be adjusted in the XY axis directions as shown in FIG. 1 by rotation of offset arm 19. As shown, the offset arm 19 has an internally-disposed channel within which the fixture element 2 can traverse. As shown, the fixture element 2 comprises a dovetail block 20 (FIGS. 18, 20) which is complementary to the channel, which is a dovetail-shaped groove.

The height and angularity of the fixture element 2 can be adjusted by moving it along the Z axis and rotating it around the AB axes until desired locations are obtained. Since the fixture element 2 is of a circular shape the adjustment of C axis rotational angularity is normally not required.

In the storage position, the centerline of the fixture element 2 may be adjusted in the XY axes by rotating rotation of offset arm 19 to, for example, the 3:00 position. The fixture element 2 may also be moved along the channel in offset arm 19 until the fixture element 2 is concentric with support tube 23 as shown in FIG. 9.

Referring now to FIGS. 10-13, a fixture element 3 is shown in the working position and storage position. This embodiment incorporates two fixture elements 2 which are movably connected to channels shown in crossbar 40. Such connection allows these fixture elements 2 to be adjusted independently along linear axes XY and rotary axes AB, together with crossbar 40 which can be adjusted independently along linear axes XYZ and rotary axes ABC.

Since two fixture elements 2 are mounted on crossbar 40 which also can be rotated around the ABC axes, dual fixture element assembly 3 provides an additional angular adjustment range which allows it to hold contoured workpieces which are predominantly cylindrical, such as aircraft nacelle covers, with all workpiece support assemblies mounted on the same plane.

Figure 10:
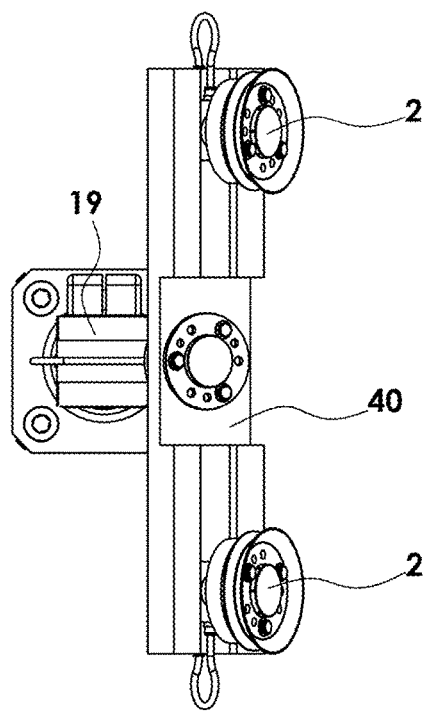
FIG. 10 is a top view of a workpiece support having a cross-bar and two end surfaces, in a working position.
Figure 12:
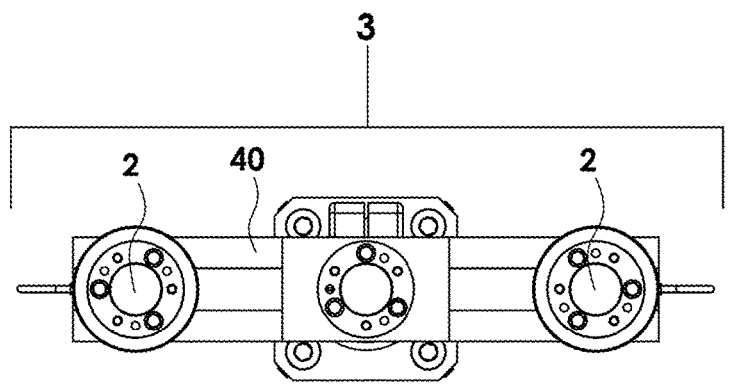
FIG. 12 is a top view of the workpiece support of FIG. 10 in a storage position.
Figure 11:
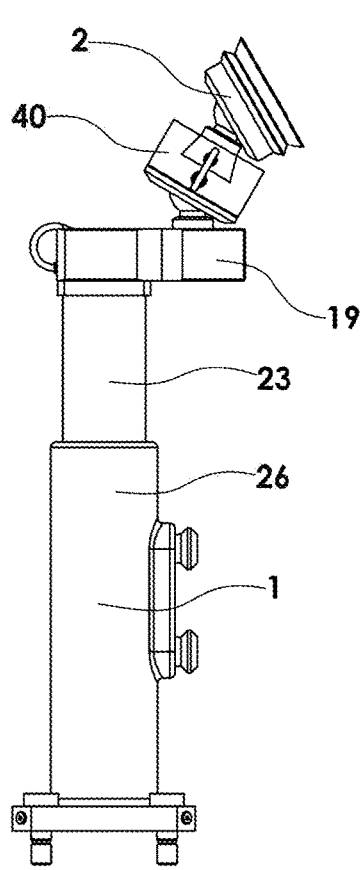
FIG. 11 is a front view of the workpiece support of FIG. 10.
Figure 13:
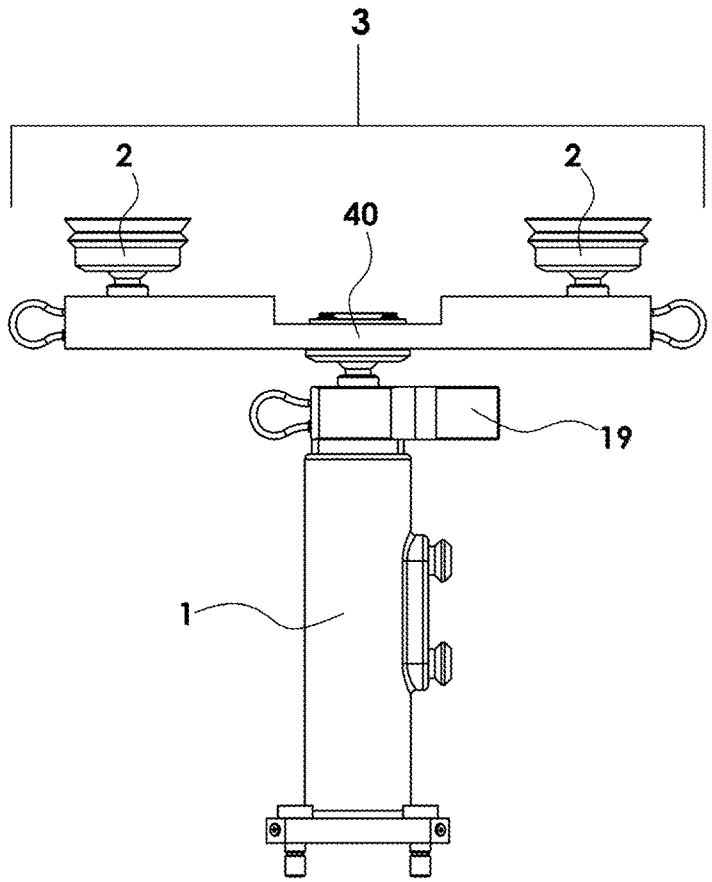
FIG. 13 is a front view of the workpiece support of FIG. 12.

The storage position may require the centerline of the dual fixture element assembly 3 to be adjusted in the XY axes as shown in FIG. 1 by rotating the offset arm 19 to, for example, the 3:00 position as shown in FIGS. 10 and 13, together with moving the dual fixture element assembly 3 along the channel in offset arm 19 until the workpiece engaging end effector assembly 3 is concentric with support tube 23. Storage position may require that crossbar 40 be rotated so it is parallel to said offset arm 19.

Referring now to FIGS. 14-17, the workpiece support 1 is shown with a contoured fixture element 4. The centerline of the contoured fixture element 4 can be adjusted in the XY axis by rotating the offset arm 19 as shown in FIG. 1. Further, the contoured fixture element 4 may be moved along the channel in offset arm 19 to the desired location.

Figure 18:
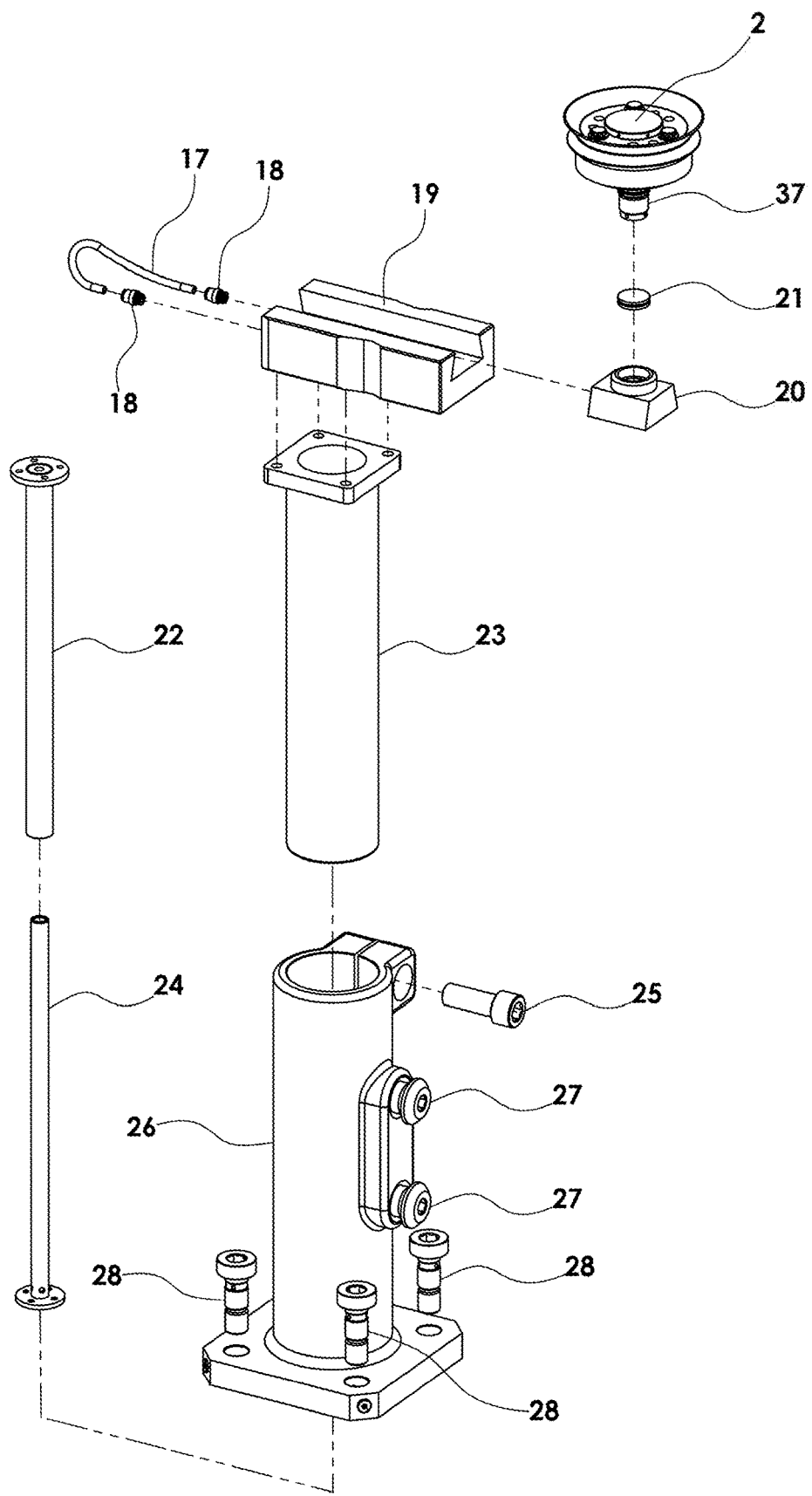
FIG. 18 is an exploded perspective view of a workpiece support assembly as shown in FIGS. 6-9.
Figure 23:
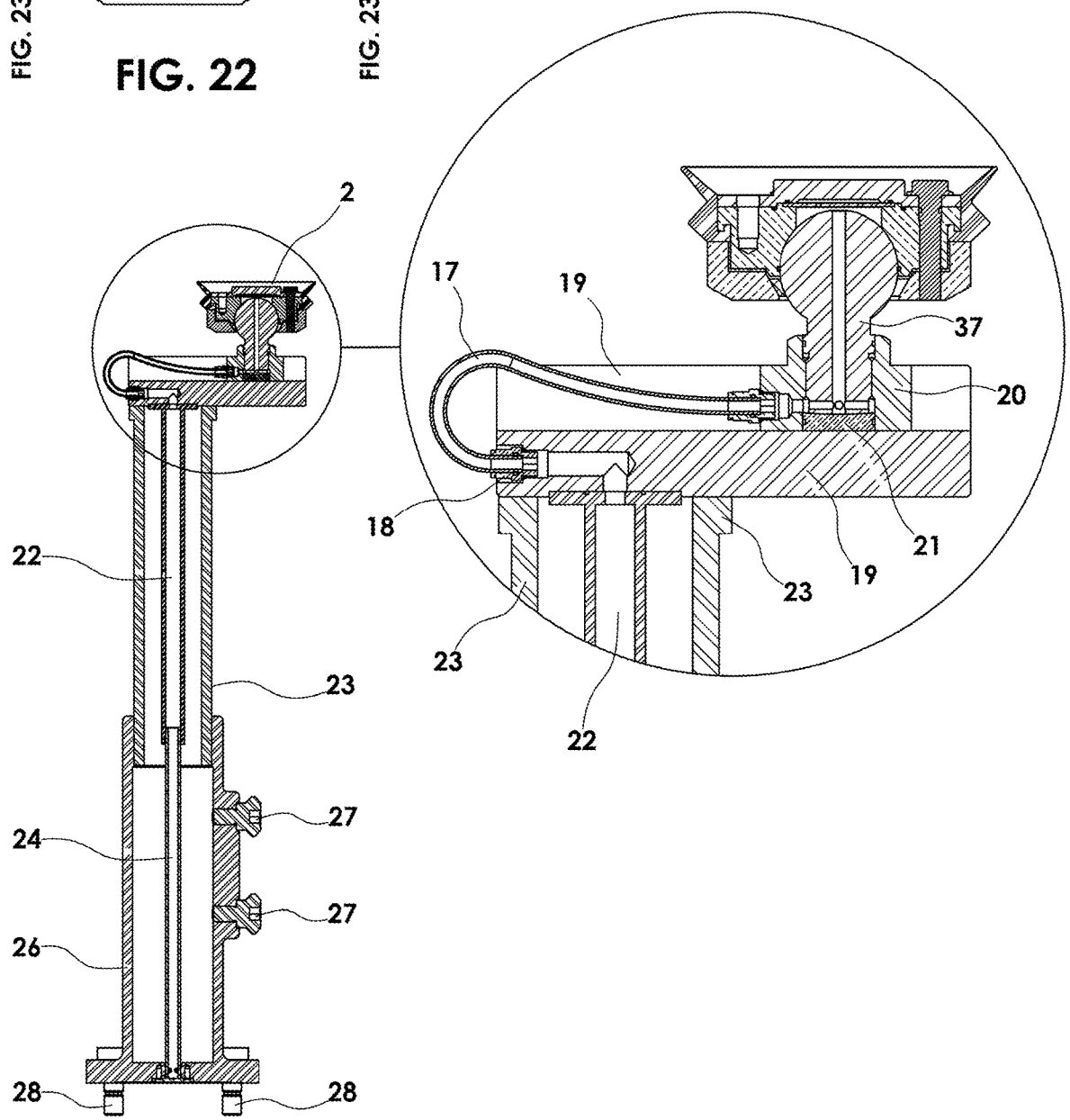
FIG. 23 is a front section view of FIG. 22.
Figure 24:
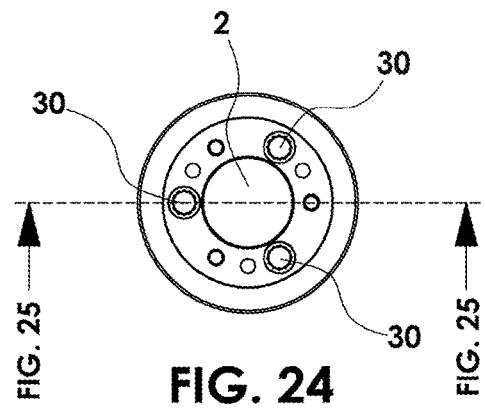
FIG. 24 is a top view of a fixture element.
Figure 25:
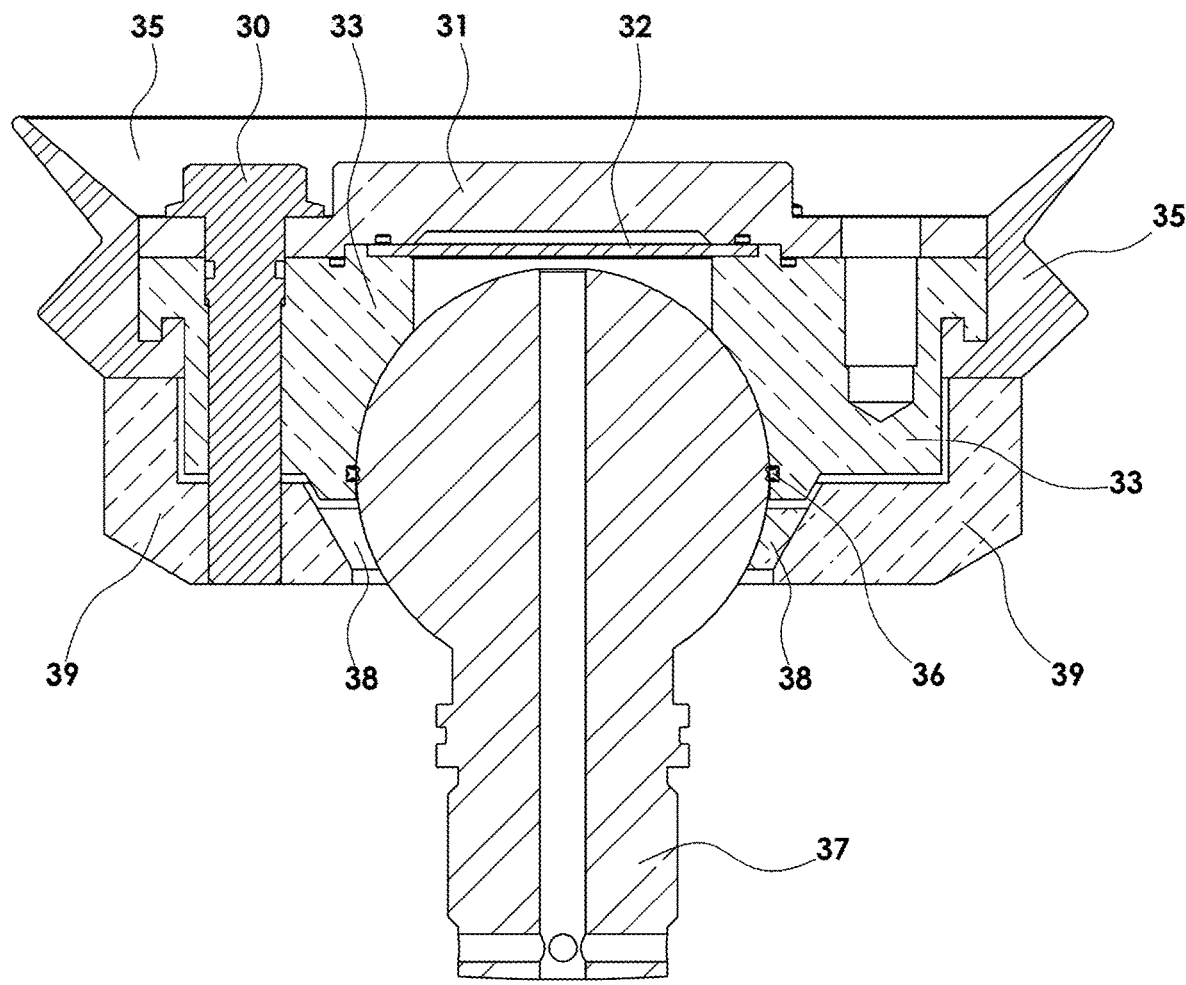
FIG. 25 is a front section view of FIG. 24.

Referring now to FIGS. 18 and 23, the support assembly comprises the support tube 23 within a pedestal 26. The height of support tube 23 can be adjusted along the ZC axes at multiple heights and angles. Support tube 23 can be immobilized relative to pedestal 26 by tightening the support tube lock screw 25. Offset arm 19 is attached to support tube 23. The workpiece support 1 comprises an upper vacuum tube 22 and lower vacuum tube 24. The upper vacuum tube 22 is permanently attached to offset arm 19 and movably connects to lower vacuum tube 24 which is attached to the pedestal 26. The lower vacuum tube 24 is connected to a vacuum system within the workpiece holding pallet 6. As best shown in FIG. 23, a flexible vacuum tube 17 is attached to the support tube 23 and the dovetail block 20 such that the vacuum tubes 24, 22 are in communication with an internal passage 18 within offset arm 19.

The fixture element (whether type 2, 3, or 4) is attached to the dovetail clamp block 20 by pivot ball 37. A clamp disk 21 may be acted upon by the pivot ball 37 which further acts upon dovetail clamp block 20 causing it to be wedged frictionally within offset arm 19. This causes immobilization of the fixture element 2, 3 or 4 relative to offset arm 19.

Conversely the fixture element 2, 3 or 4 may be rotated to remove frictional force between dovetail clamp block 20 and offset arm 19. As a result, the dovetail clamp block 20 may be mobilized relative to the dovetail groove in the top of offset arm 19. The pivot ball 37 comprises an internal passage such that vacuum pressure from tube 17 is applied at a surface of the fixture element 2, 3, 4.

Attachment screws 28 interact with the pedestal 26 to locate it on the pallets 6.

Figure 19:
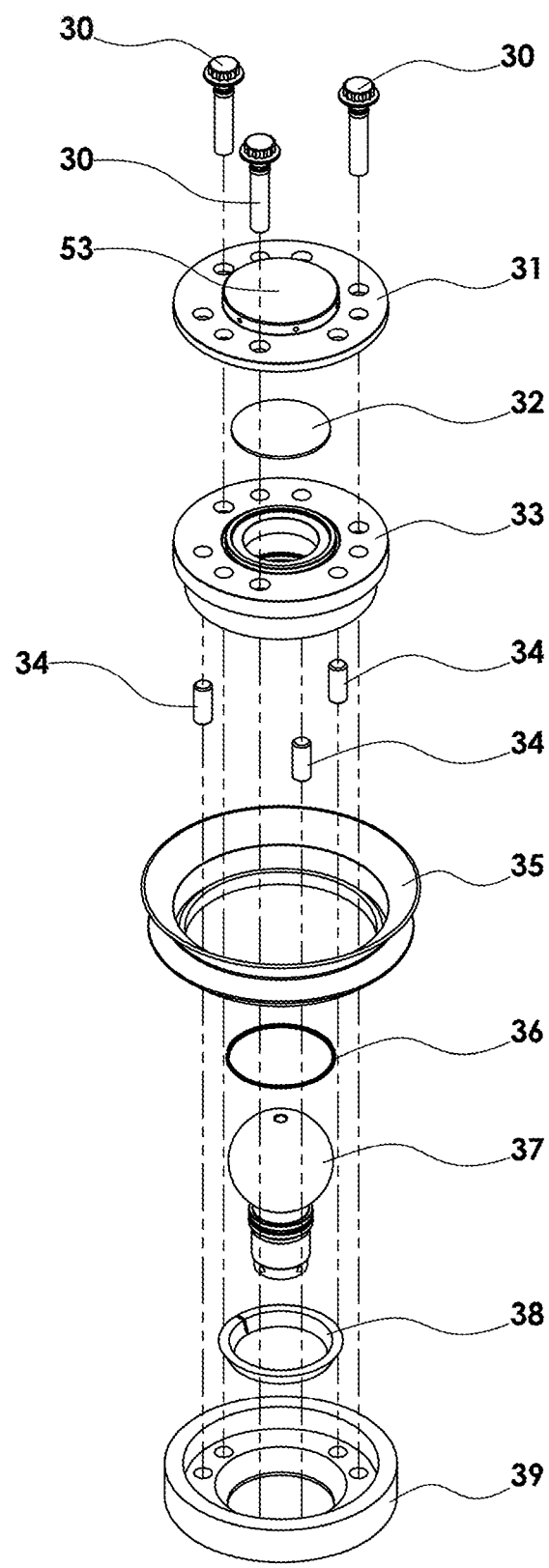
FIG. 19 is an exploded perspective view of the fixture element for use with the support assembly of FIG. 18.
Figure 20:
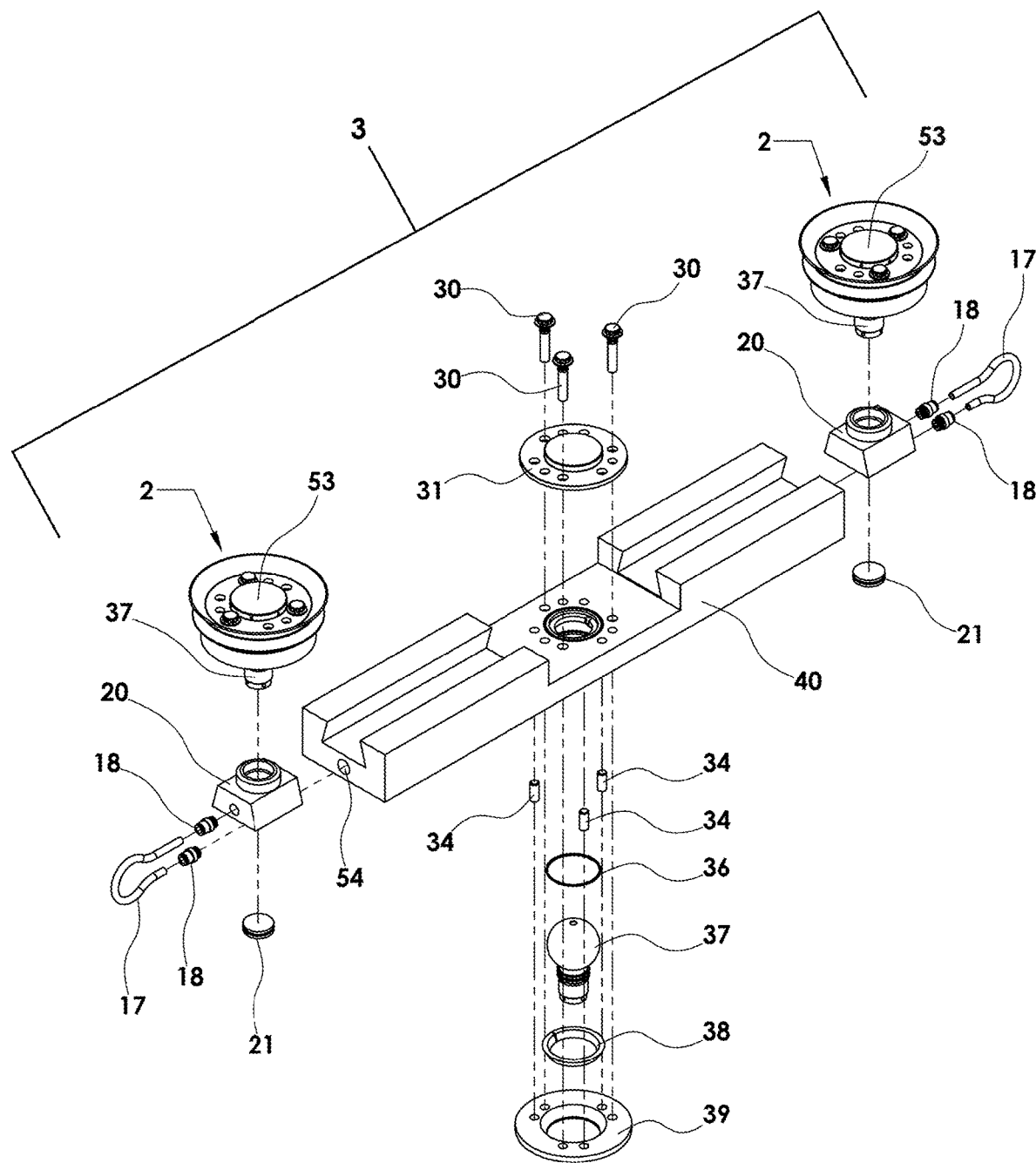
FIG. 20 is an exploded perspective view of the workpiece support assembly as shown in FIGS. 10-13.
Figure 21:
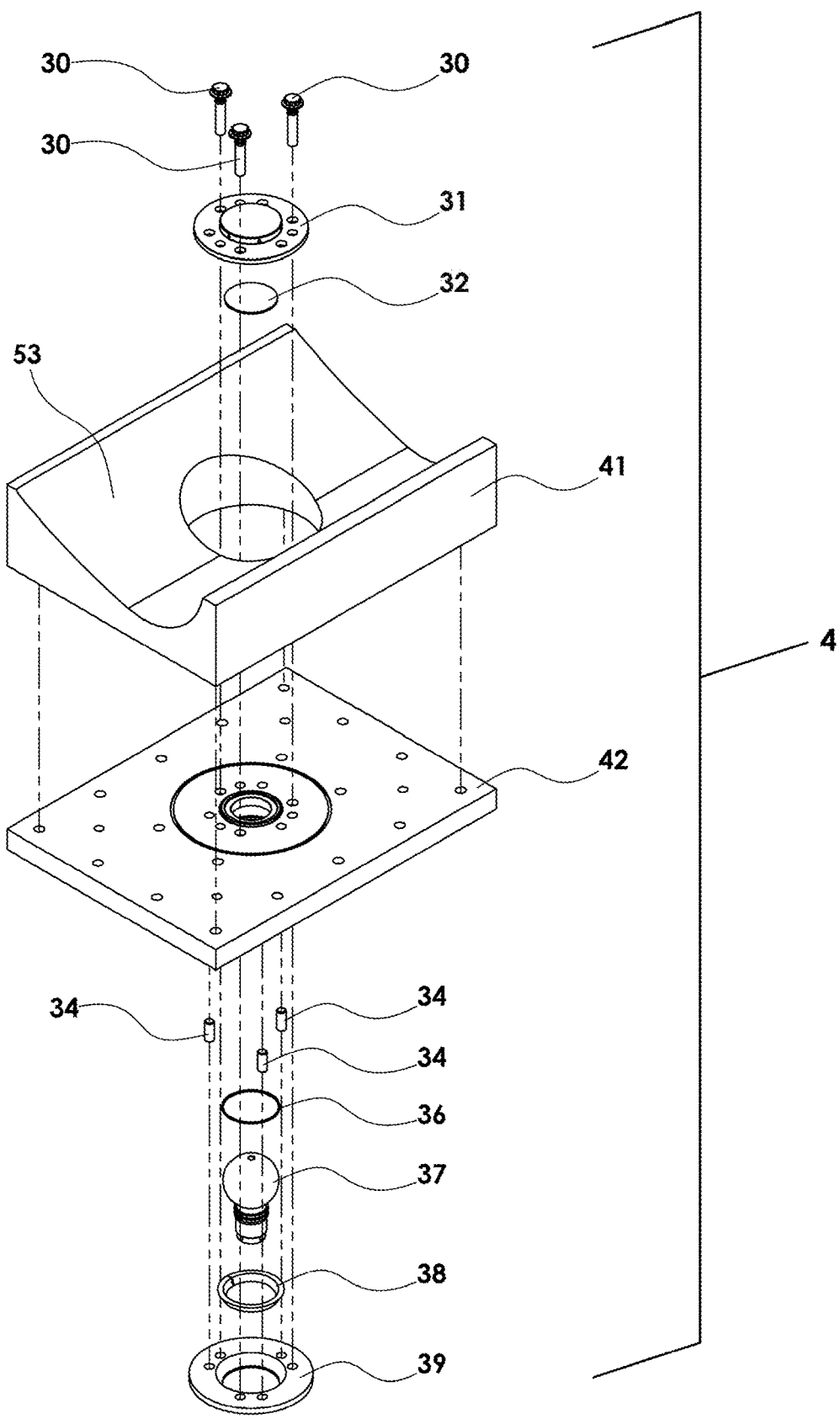
FIG. 21 is an exploded perspective view of the workpiece support as shown in FIGS. 14-17.

FIGS. 19, 20 and 21 show components of fixture elements 2, 3 and 4, respectively. Each of these fixture elements can be internally mobilized, which is the state in which workpiece engaging surfaces 53 can be rotated freely around ABC axes relative to pivot ball 37. The fixture elements 2, 3, 4 can be internally immobilized, which refers to the state in which the workpiece engaging surfaces 53 is fixed in position relative to the pivot ball 37 at the orientation provided prior to immobilization.

Referring now to FIGS. 19-21, internal immobilization of fixture elements 2, 3, 4 is achieved by tightening three adjustment clamp screws 30. The screws 30 are attached to a clamp flange 39.

Each of the fixture elements 2, 3, 4 has nine holes located in the workpiece engaging surface 53. These holes each engage with an element of the end effector assembly 12 disposed on the fixture building robot 102 (FIGS. 30-46). Preferably, there are three sets of three holes, with the clamp screws 30 located in one such set.

With reference to FIGS. 18, 19, 24 and 25, fixture element 2 is shown in detail. The clamp screws 30 may be actuated to cause a datum reference flange 31 to act upon a socket flange 33 and further causing clamp flange 39 to act upon conical clamp ring 38. This further causes the socket flange 33 and conical clamp ring 38 to act upon pivot ball 37 which frictionally immobilizes the position of socket flange 33 relative to the position of pivot ball 37.

Internal mobilization is achieved by loosening the three adjustment clamp screws 30.

Alignment dowels 34 allow torsional loads to be applied to datum reference flange 31 and socket flange 33 while maintaining alignment with clamp flange 39. An O-ring seal 36 prevents leakage of vacuum between socket flange 33 and pivot ball 37.

Figure 26:
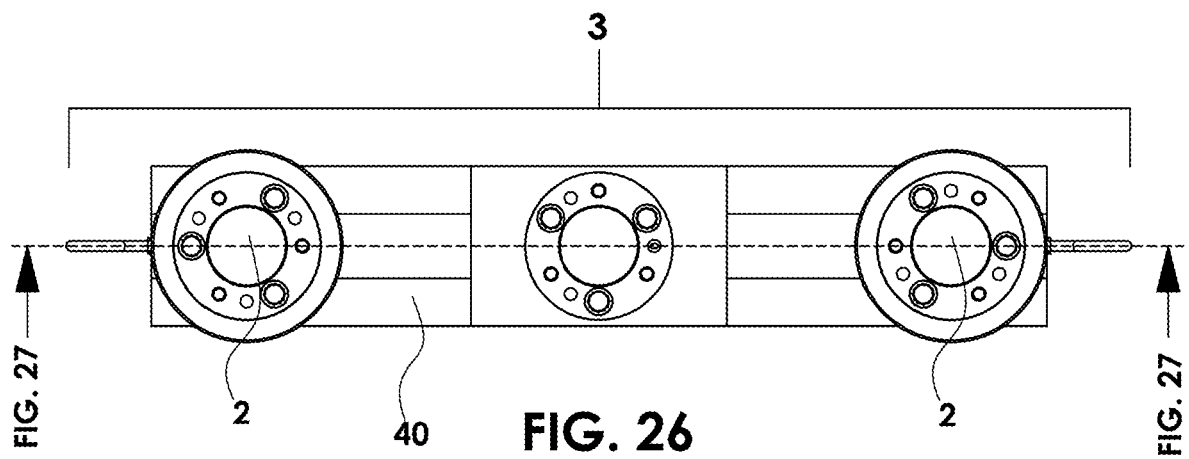
FIG. 26 is a top view of a fixture element.
Figure 27:
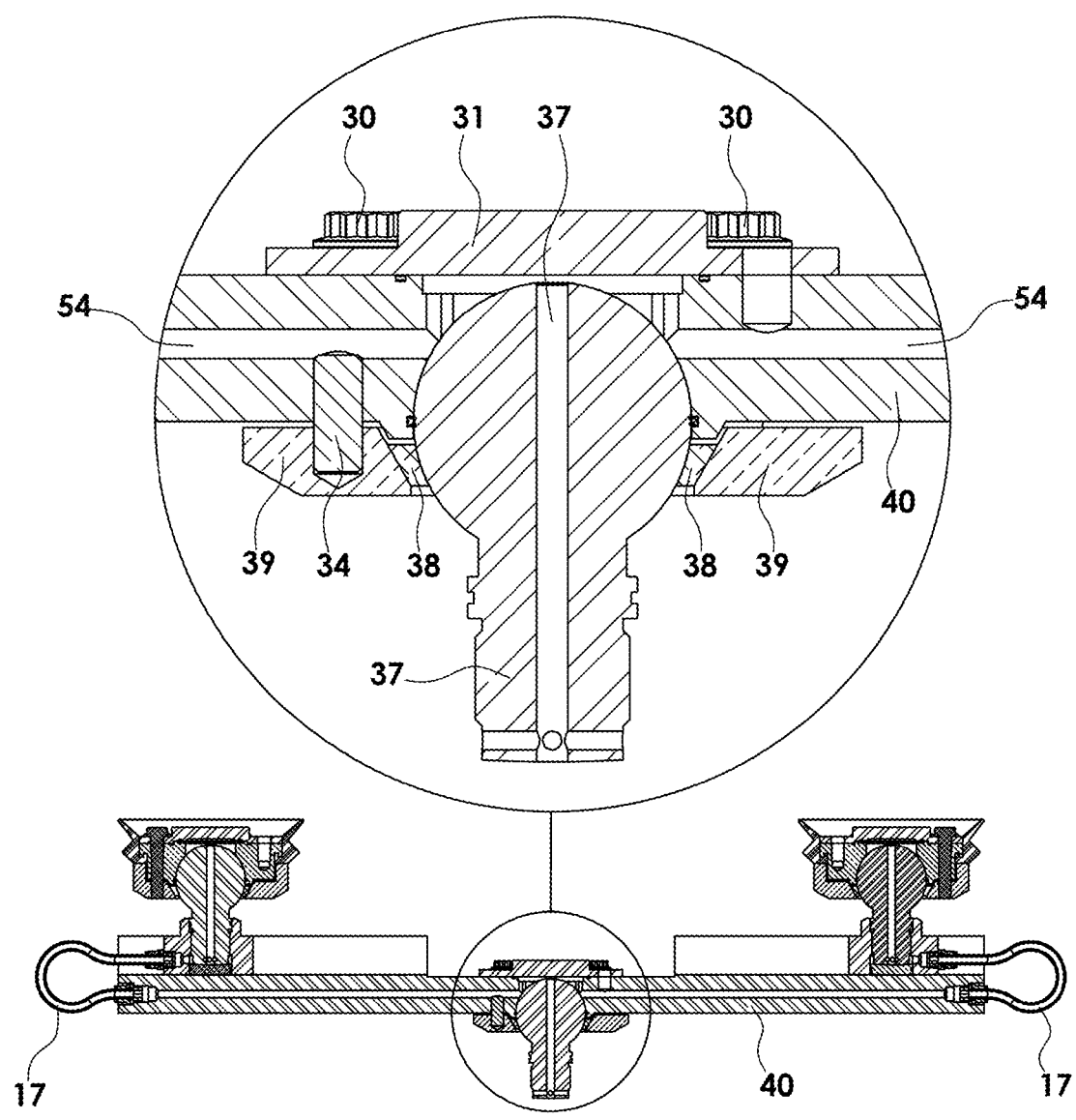
FIG. 27 is a front section view of FIG. 26.

In FIGS. 20, 26 and 27, a dual member fixture element 3 may be similarly immobilized. Internal immobilization of the crossbar 40 assembly is achieved by tightening three adjustment clamp screws 30 which are attached to clamp flange 39 causing datum reference flange 31 to act upon crossbar 40. This further causes clamp flange 39 to act upon conical clamp ring 38 and further causing crossbar 40 and conical clamp ring 38 to act upon pivot ball 37 which frictionally immobilizes the position of crossbar 40 relative to the position of pivot ball 37. Internal mobilization is achieved by loosening three adjustment clamp screws 30 which releases frictional clamping force and allows the position of crossbar 40 to be mobilized relative to the position of pivot ball 37.

Alignment dowels 34 allow torsional loads to be applied to datum reference flange 31 and crossbar 40 while maintaining alignment with clamp flange 39. O-ring seal 36 prevents leakage of vacuum between flexible vacuum tubes 17 connected to crossbar vacuum hole 54 and pivot ball 37. Two fixture elements 2 are attached to dovetail clamp block 20 by pivot ball 37 with, for example, right-hand threads thereby allowing right-hand rotation applied to an internally immobilized fixture element 2 around the C axis (FIG. 1) to be transferred through pivot ball 37. The pivot ball 37 acts upon clamp disc 21 which causes the dovetail clamp block 20 to be wedged frictionally within crossbar 40, immobilizing the fixture element 2 relative to crossbar 40. Conversely the application of left-hand rotation to the fixture element 2 removes frictional force between dovetail clamp block 20 and crossbar 40 thereby allowing dovetail clamp block 20 to be mobilized relative to crossbar 40.

Figure 28:
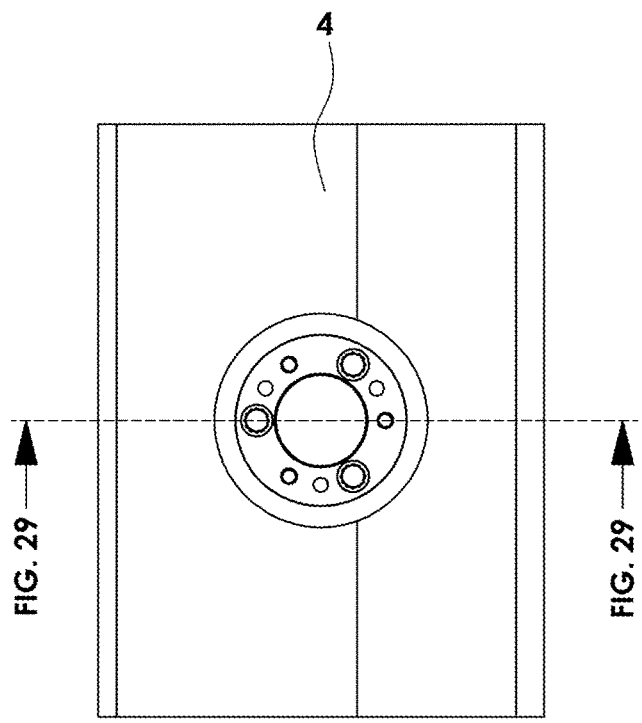
FIG. 28 is a top view of a fixture element.
Figure 29:
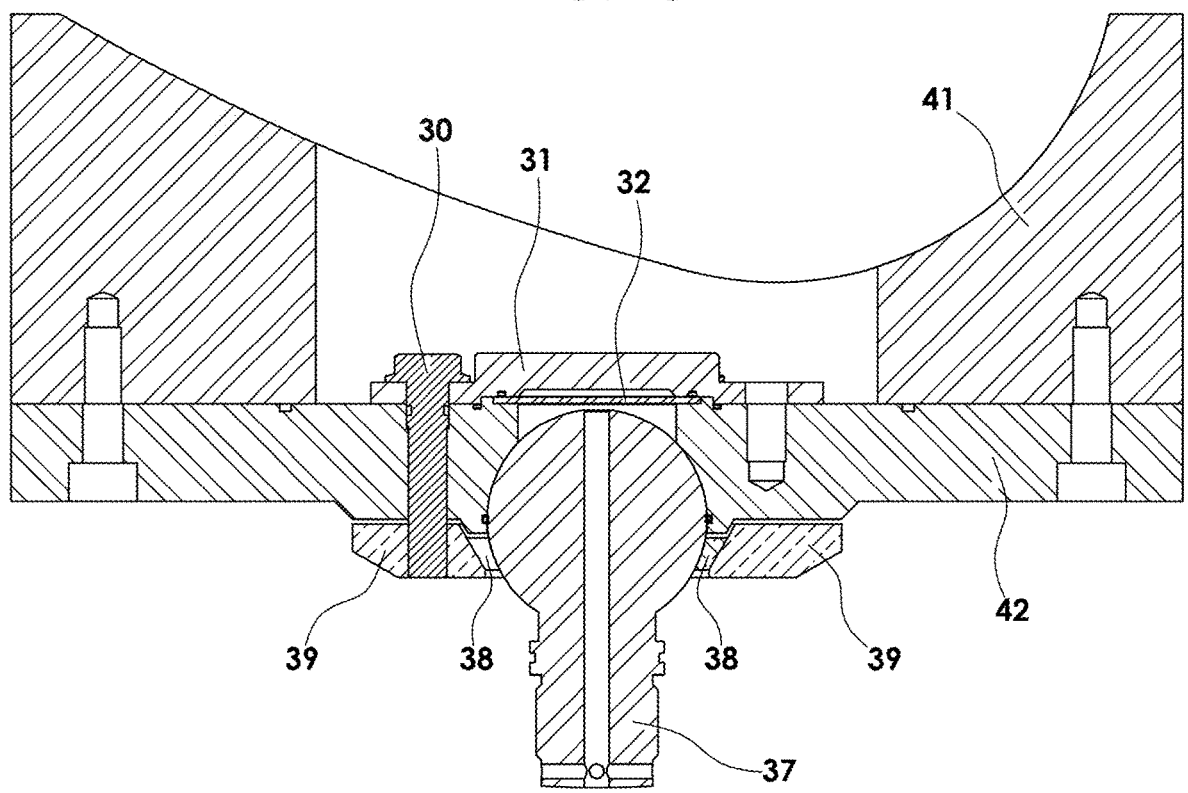
FIG. 29 is a front section view of FIG. 28.

In FIGS. 21, 28 and 29, a contoured fixture element 4 is similarly constructed. Internal immobilization is achieved by tightening of three adjustment clamp screws 30 which are attached to clamp flange 39. This causes the datum reference flange 31 to act upon a block attachment plate 42. As a result, clamp flange 39 acts upon conical clamp ring 38 and causes the block attachment plate 42 and conical clamp ring 38 to act upon pivot ball 37. This frictionally immobilizes the position of block attachment plate 42 relative to the position of pivot ball 37. Internal mobilization is achieved by loosening three adjustment clamp screws 30 which releases frictional clamping force and allows the position of block attachment plate 42 to be mobilized relative to the position of the pivot ball 37.

Alignment dowels 34 allow torsional loads to be applied to datum reference flange 31 and block attachment plate 42 while maintaining alignment with clamp flange 39. O-ring seal 36 prevents leakage of vacuum between block attachment plate 42 and pivot ball 37.

Figure 22:
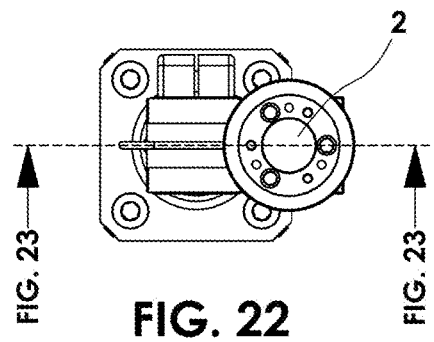
FIG. 22 is a top view of a workpiece support assembly.

Referring now to FIGS. 22-23, the offset arm 19 is permanently attached to support tube 23. Internally, the upper vacuum tube 22 is permanently attached to offset arm 19 and movably connects to lower vacuum tube 24 which is permanently attached to pedestal 26. The upper vacuum tube 22 and lower vacuum tube 24 are internally sealed, and may telescope. As shown, the upper vacuum tube 22 surrounds a portion of the lower vacuum tube 24, but other configurations are anticipated. The internal passage 18 is in communication with a flexible tube 17. The flexible tube attaches to the dovetail clamp block 20 at all positions within the channel of the offset arm 19.

Referring now to FIGS. 30-46, the process of orienting the fixture element 2 on a workpiece support 1 is shown. It should be understood that while a type 2 fixture element is shown, a type 3 or 4 support would be oriented in a similar way.

The fixture building robot 102 comprises an inner housing 50 and the outer housing 11. Clamp cylinders 48 are attached to a flange ring 49. The flange ring 49 is swivably supported by the inner housing 50. The end effector assembly 12 is attached to the flange ring 49.

The clamp cylinders 48 frictionally immobilize flange ring 49 relative to robotic end effector inner housing 50 when pressurized and allow flange ring 49 to be rotated within robotic end effector inner housing 50 when depressurized.

The robot 102 further comprises three attachment nutrunner motors 47A and three adjustment nutrunner motors 47B. Each attachment nutrunner motor 47A is attached to a corresponding attachment spindle 51A. Each adjustment nutrunner motor 47B is attached to a corresponding adjustment spindle 51B.

As the robotic end effector assembly 12 begins interfacing with fixture element 2, three nutrunner alignment dowels 46 in the robotic end effector assembly 12 are inserted into corresponding alignment holes in fixture element 2 thereby allowing torsional forces to be transferred from the robotic end effector assembly 12 to the fixture element 2, 3 or 4.

Figure 32:
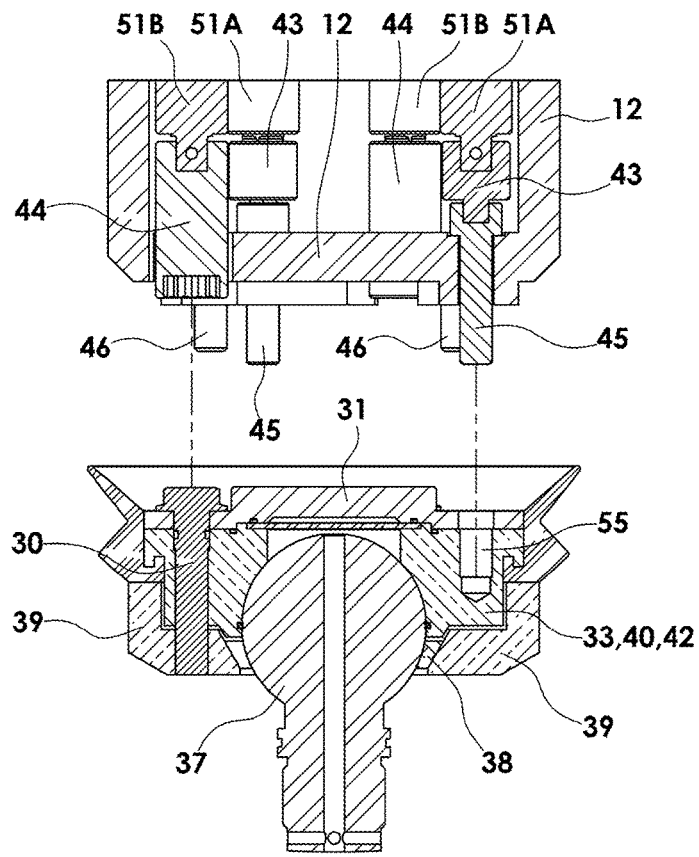
FIG. 32 is a right section view of FIG. 31.
Figure 33:
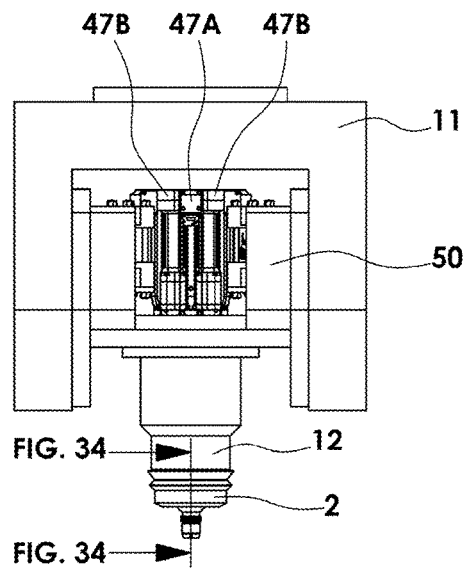
FIG. 33 is a front view of an end effector assembly interfacing with a fixture element.
Figure 34:
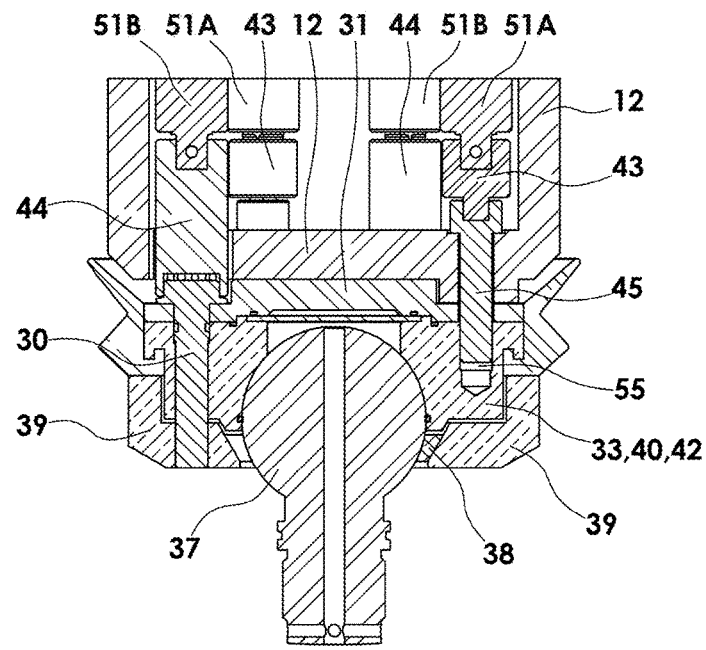
FIG. 34 is a right section view of FIG. 33.

The attachment nutrunner motors 47A rotate the three attachment nutrunner spindles 51A. The spindles may be attached to attachment drivers 43, and distally attached screws 45, all in alignment with nutrunner motors 47A. The three attachment screws 45 are threadedly inserted into fixture element 2 at attachment holes 55 as shown in FIGS. 32 and 34.

Three adjustment nutrunner motors 47B are connected with the three adjustment nutrunner spindles 51B. These are connected to adjustment drivers 44 in alignment with adjustment nutrunner motors 47B. The drivers 44, when the end effector assembly 12 is attached to the fixture element 2, are aligned with the three adjustment clamp screws 30 located on top of fixture element 2. This allows clamp screws 30 to be tightened to immobilize the fixture element 2 or loosened to mobilize the fixture element 2.

Figure 35:
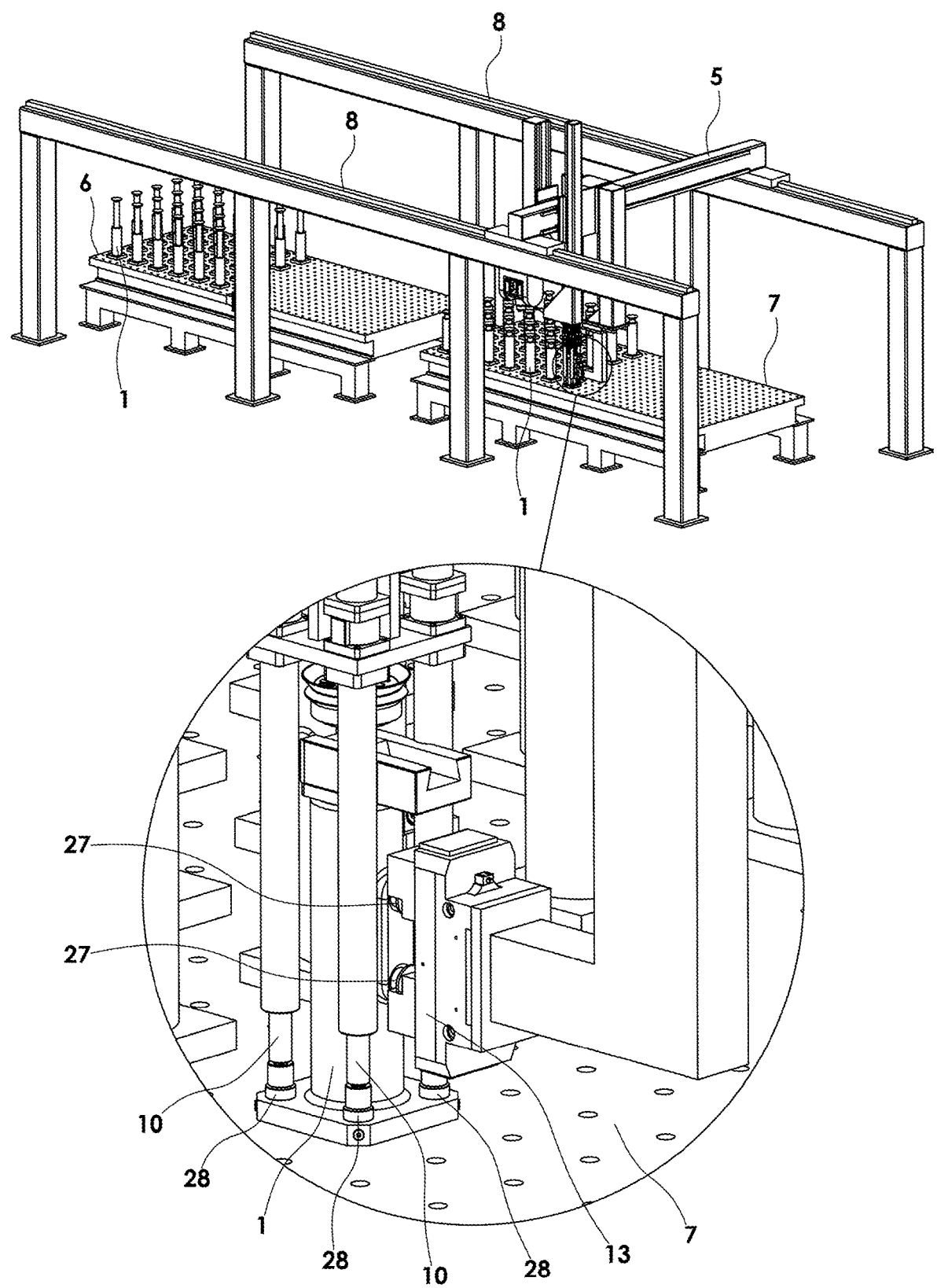
FIG. 35 is a perspective view with associated detail view showing workpiece support assembly in the process of being detached from a storage pallet with the fixture building robot.

The gripper assembly 13, as best shown in FIG. 35, interfaces with transport studs 27 to lift and carry a workpiece support 1 from the storage pallet 7 to the workpiece pallet 6. In addition, the vertical nutrunner assembly 10 loosens four attachment screws 28 disposed at the base of the pedestal 26. After the screws 28 are loosened, the gripper 13 interfaces with transport studs 27 to lift and move the workpiece support 1.

Figure 36:
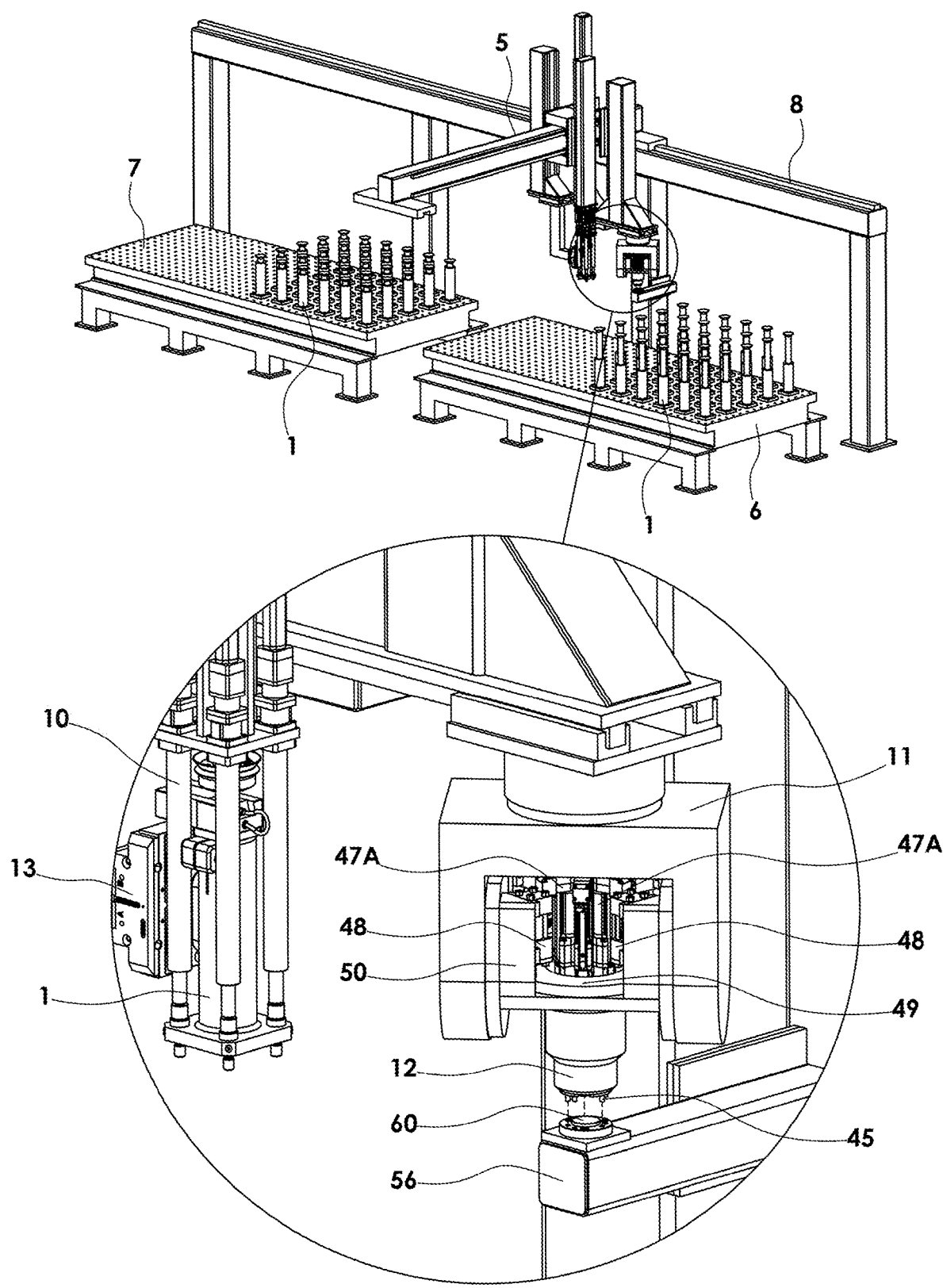
FIG. 36 is a perspective view with a portion of the stationary framework removed for clarity, together with associated detail view showing angular adjustment of the end effector assembly.

In FIG. 36, a portion of the stationary framework of columns and beams 8 is removed for clarity. Fluidic clamp cylinders 48 are attached to robotic end effector inner housing 50 and allow flange ring 49 to be rotated within robotic end effector inner housing 50 when fluidic clamp cylinders 48 are depressurized and robotic end effector assembly 12 is attached to datum reference flange 31 by tightening three attachment screws 45 using the attachment nutrunner motors 47A and then rotating the outer housing 11. Once the desired angle for robotic end effector assembly 12 is reached, fluidic clamp cylinders 48 are pressurized to immobilize robotic end effector assembly 12 relative to robotic end effector inner housing 50.

In FIG. 36, the workpiece support 1 is shown in transit, being held by the gripper 13.

Figure 37:
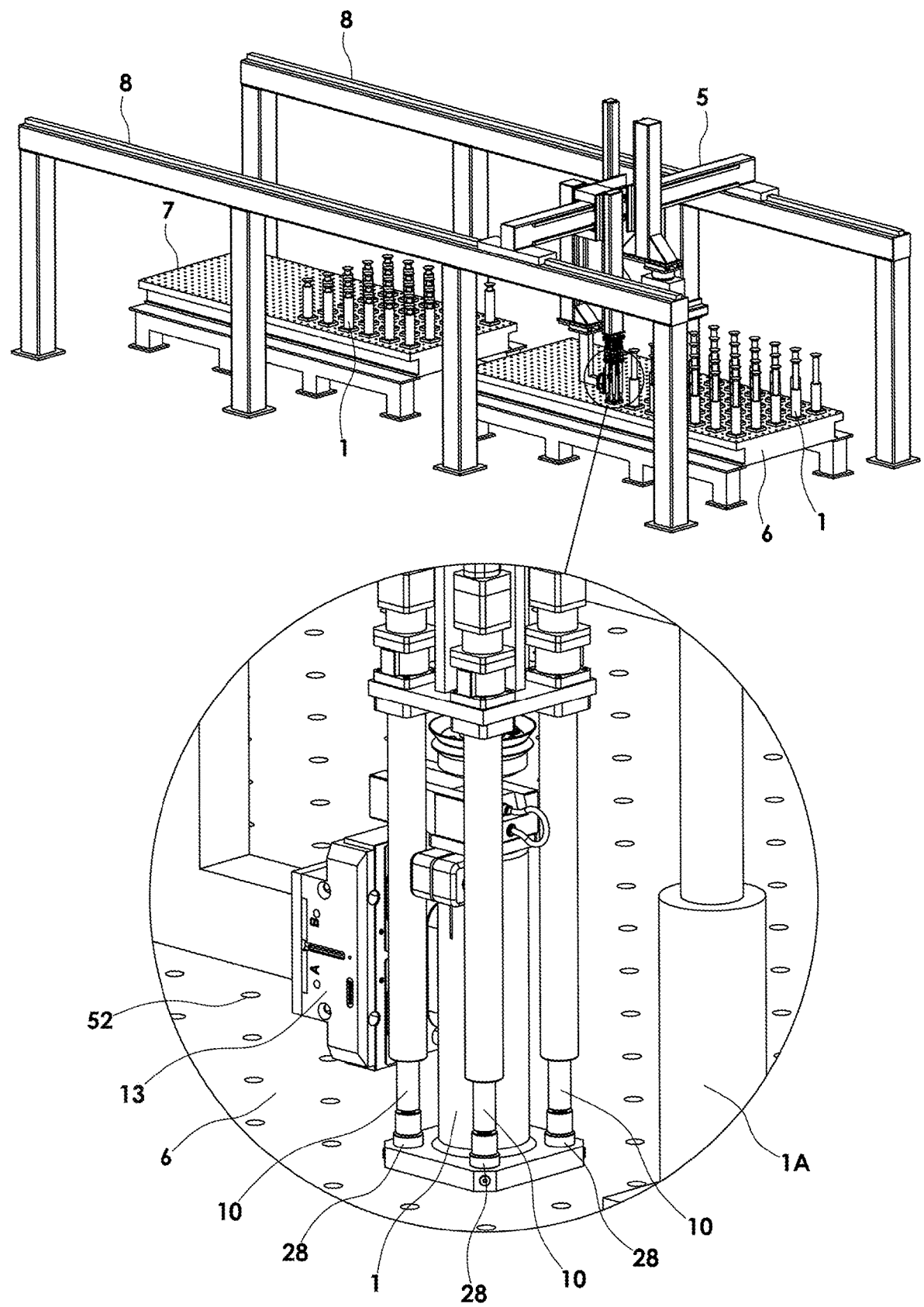
FIG. 37 is a perspective view with associated detail view showing placement of a workpiece support using the fixture building robot.

In FIG. 37, the workpiece support assembly 1 is in the process of being attached to workpiece holding pallet 6. This process includes moving robotic vertical nutrunner assembly 10 to a desired table location as corresponding to a plurality of threaded table holes 52. The four attachment screws 28 are tightened by the vertical nutrunner assembly 10 and the gripper assembly 13 is detached from the workpiece support 1.

Figure 7:
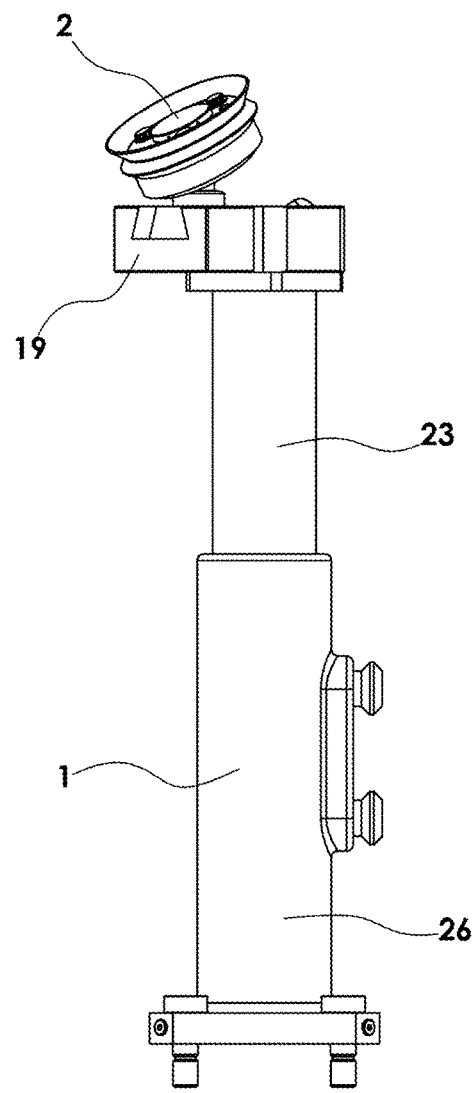
FIG. 7 is a front view of the workpiece support of FIG. 6.
Figure 38:
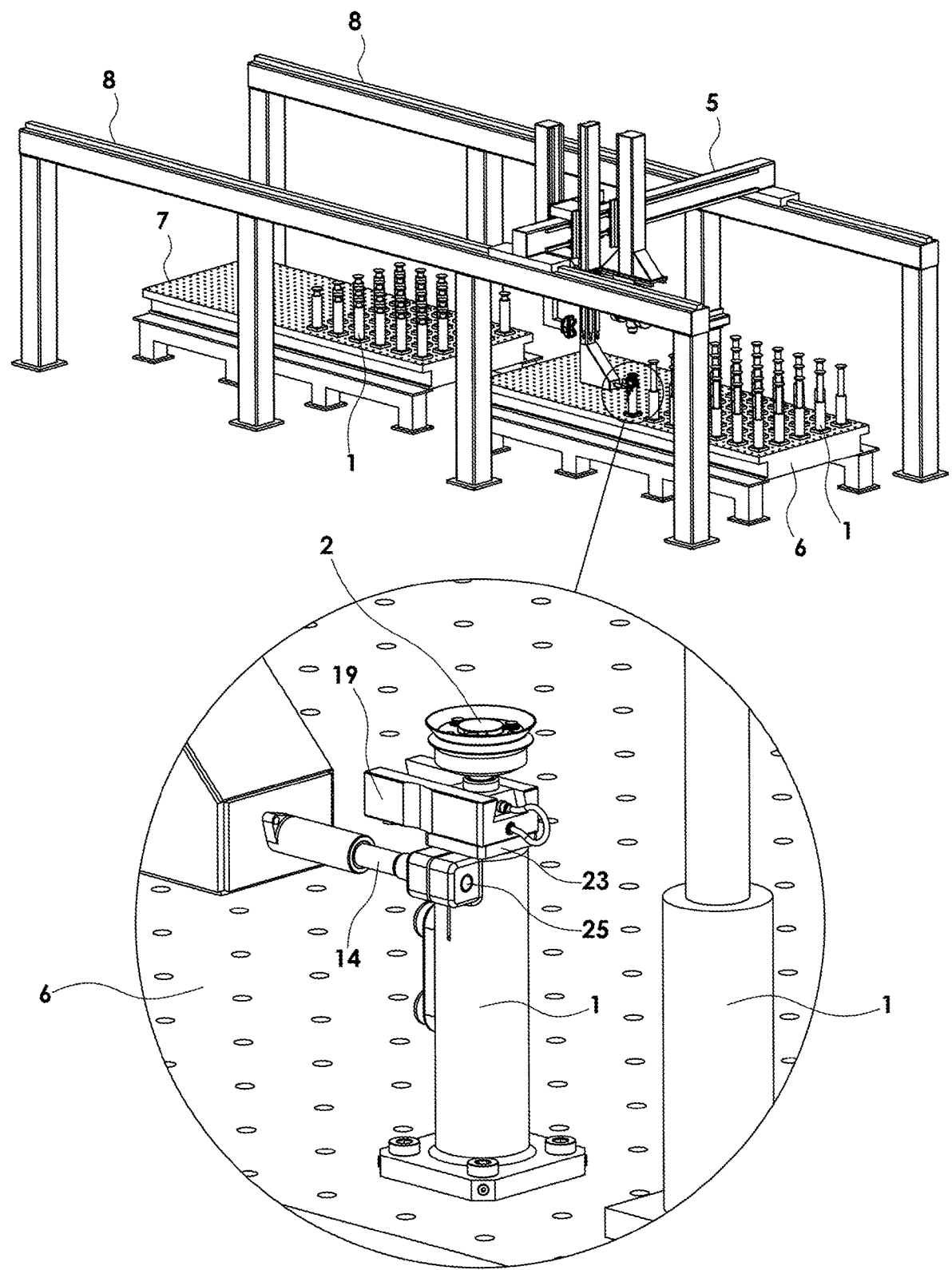
FIG. 38 is a perspective view with associated detail view showing adjustment of a lock screw with the fixture building robot.

In FIG. 38, the robotic horizontal nutrunner 14 is interfacing with the workpiece support 1 to allow mobilization for adjustment of the end surface 2. This process includes moving robotic gantry assembly 5 until the horizontal nutrunner 14 is in alignment with support tube lock screw 25. The horizontal nutrunner 14 loosens the lockscrew 25, allowing the support tube 23 to extend relative to the pedestal 26 (FIG. 7).

Figure 30:
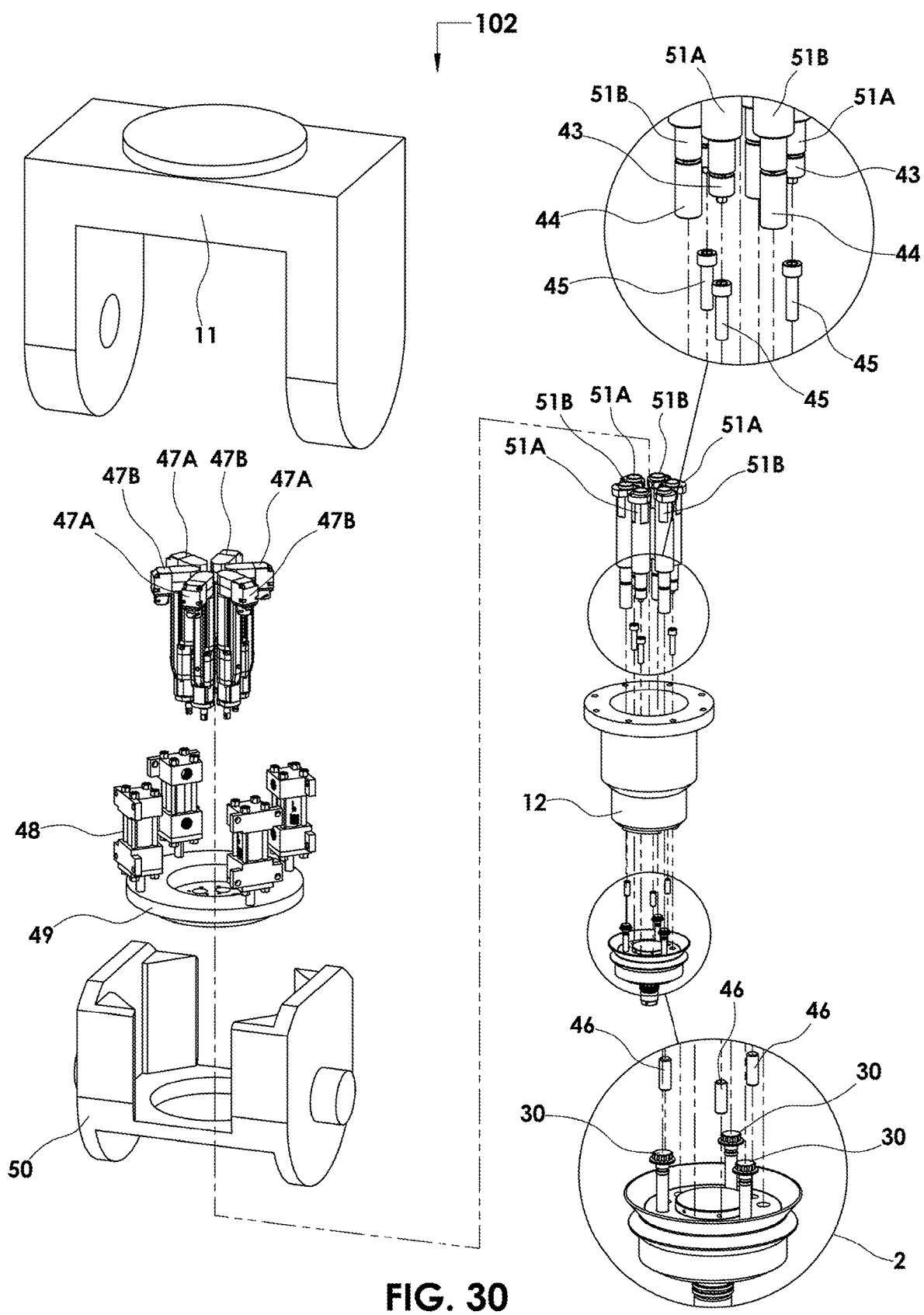
FIG. 30 is an exploded perspective view with associated detail views showing the interface between end effector assembly and a fixture element.
Figure 31:
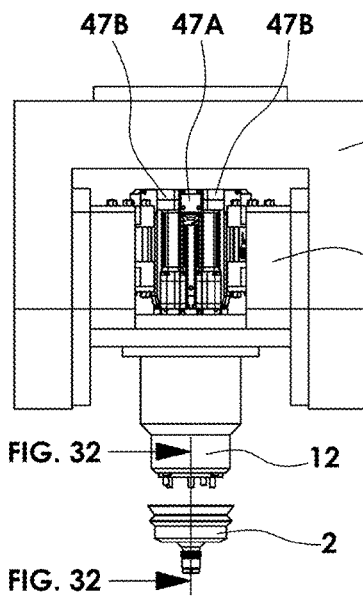
FIG. 31 is a front view of end effector assembly prior to interfacing with a fixture element.
Figure 39:
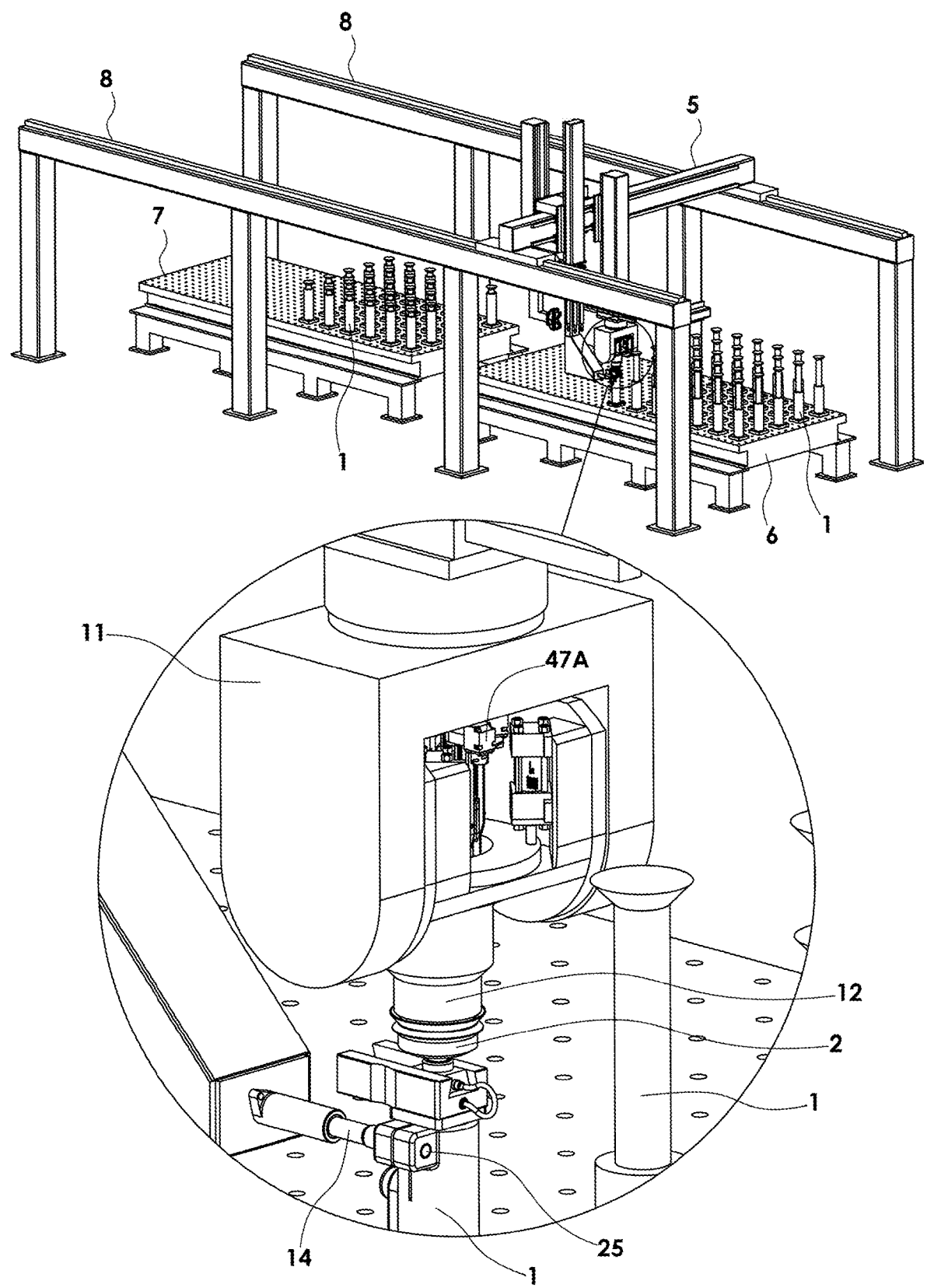
FIG. 39 is a perspective view with associated detail view showing attachment of the end effector assembly to the fixture element.

In FIG. 39, the end effector assembly 12 is interfacing with fixture element 2 as described above, to grip and mobilize the fixture element 2. This process includes moving robotic end effector outer housing 11 until robotic end effector assembly 12 is coincident with fixture element 2. The three attachment screws 45, as shown in FIG. 30, are tightened with three attachment nutrunner motors 47A acting upon three attachment nutrunner spindles 51A further acting upon three attachment drivers 43 as shown in FIG. 30. This causes the end effector assembly 12 to be attached to the fixture element 2, such that its position can be edited.

In FIG. 40, the fixture element 2 has been moved to its final Z axis workpiece holding position by the end effector assembly 12. This process includes loosening support tube lock screw 25 with the robotic horizontal nutrunner assembly 14. The support tube 23 telescopes out of the pedestal 26 (FIG. 7).

Figure 41:
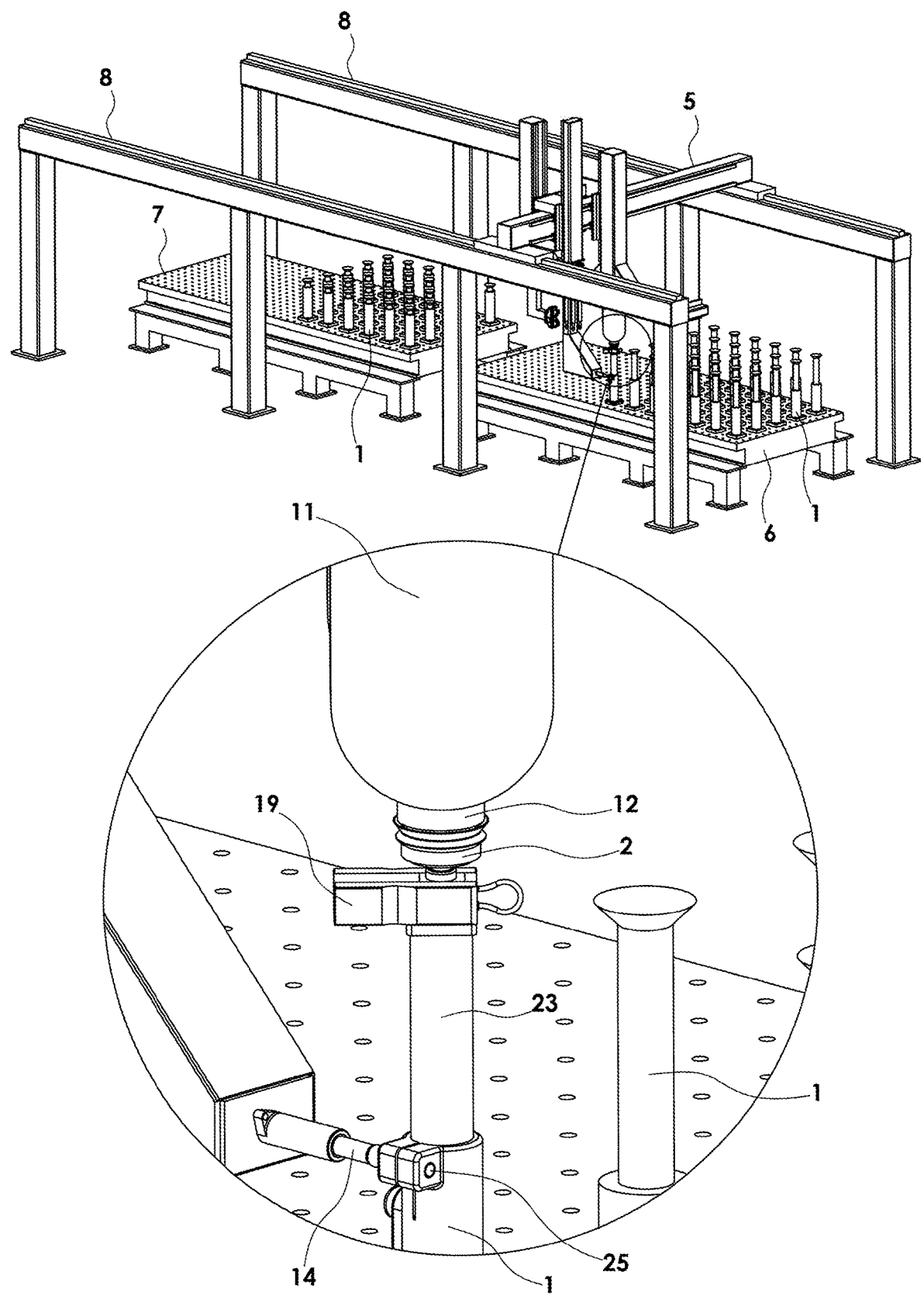
FIG. 41 is a perspective view with associated detail view showing rotation of an offset arm on the workpiece support by the fixture building robot.

In FIG. 41, the offset arm 19 has been rotated by the robotic end effector assembly 12. This process includes rotation of the outer housing 11 which is attached to the end effector assembly 12, which in turn is attached to the fixture element 2. Rotation of the fixture element 2 causes the support tube 23 to rotate within the pedestal 26, changing the relative angle of the offset arm 19. Once the desired rotation angle has been reached, the horizontal nutrunner assembly 14 tightens the support tube lock screw 25 thereby immobilizing support tube 23 and thereby immobilizing offset arm 19 at the desired rotation angle and height.

Figure 42:
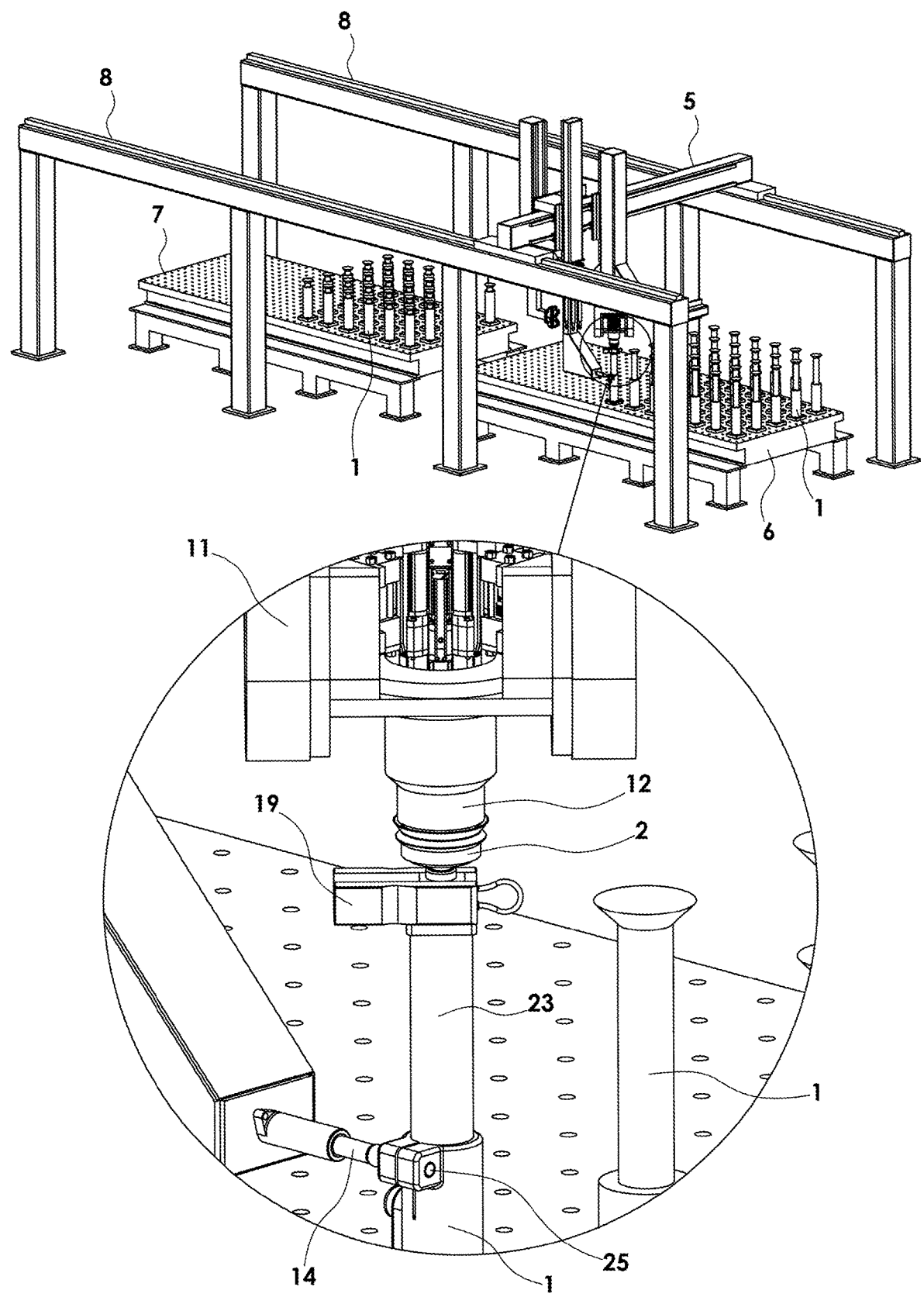
FIG. 42 is a perspective view with associated detail view showing rotation of the end effector assembly to provide for movement of the fixture element along the offset arm.

In FIG. 42, the fixture element 2 is being rotated by the end effector assembly 12 to mobilize the fixture element 2 and the dovetail clamp block 20 as shown in FIG. 18. This process includes rotation of the outer housing 11 which is attached to robotic end effector assembly 12. This rotates the fixture element 2 relative to the dovetail clamp block 20 in a loosening direction, releasing frictional clamping pressure between clamp disc 21 as shown in FIG. 18 and offset arm 19. The dovetail clamp block 20 is thereby mobilized, allowing the block 20 and fixture element 2 to be moved slidably along dovetail groove in top of offset arm 19.

Figure 43:
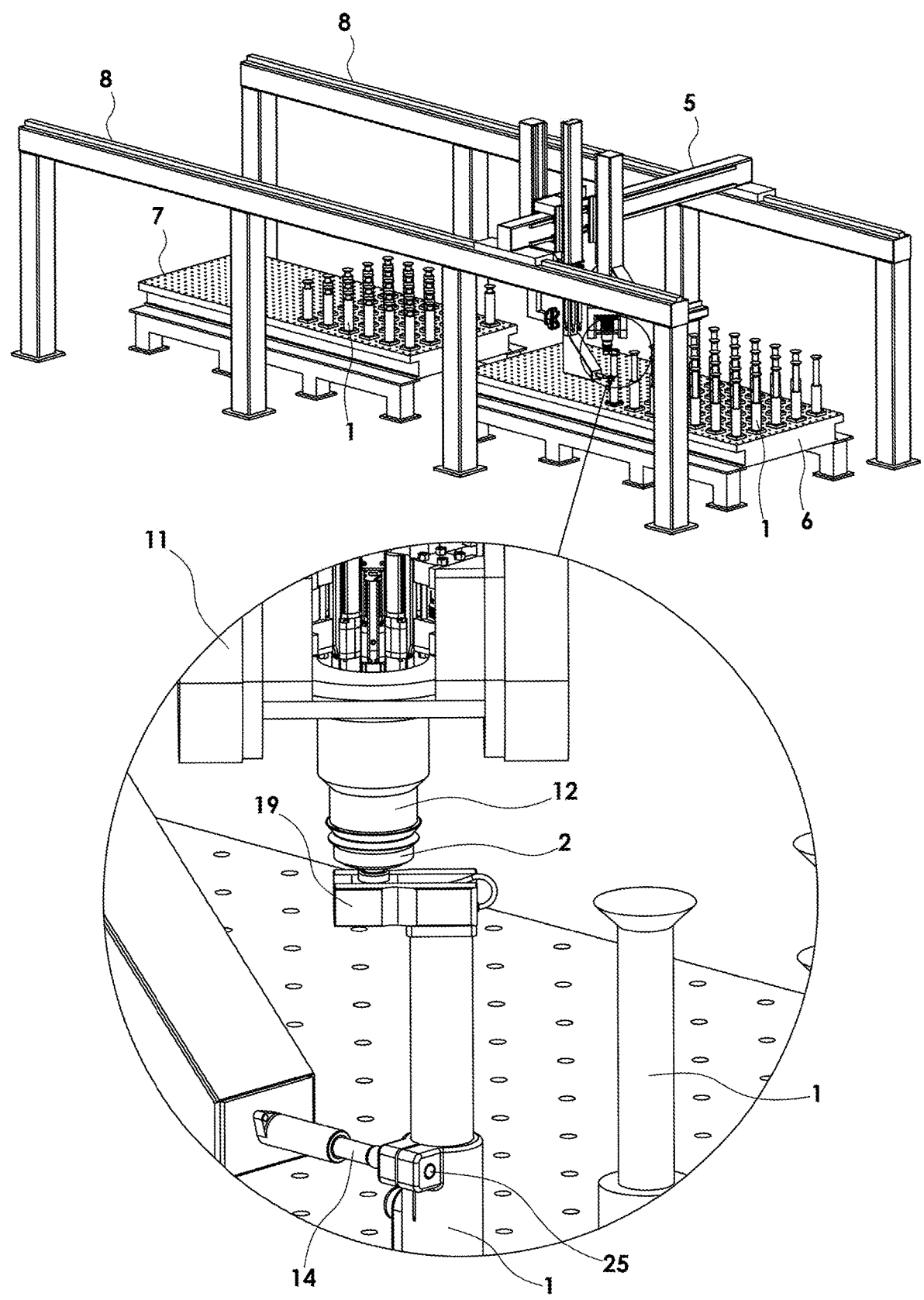
FIG. 43 is a perspective view with associated detail view showing movement of the fixture element in the X-Y plane within a groove along the offset arm.

In FIG. 43, the fixture element 2 has been slidably moved along dovetail groove in top of offset arm 19 with the end effector assembly 12. This process includes moving the end effector assembly 12 with the robotic gantry assembly 5 to its desired XY axis positions as shown in FIGS. 2-3 relative to workpiece holding pallet 6.

Figure 44:
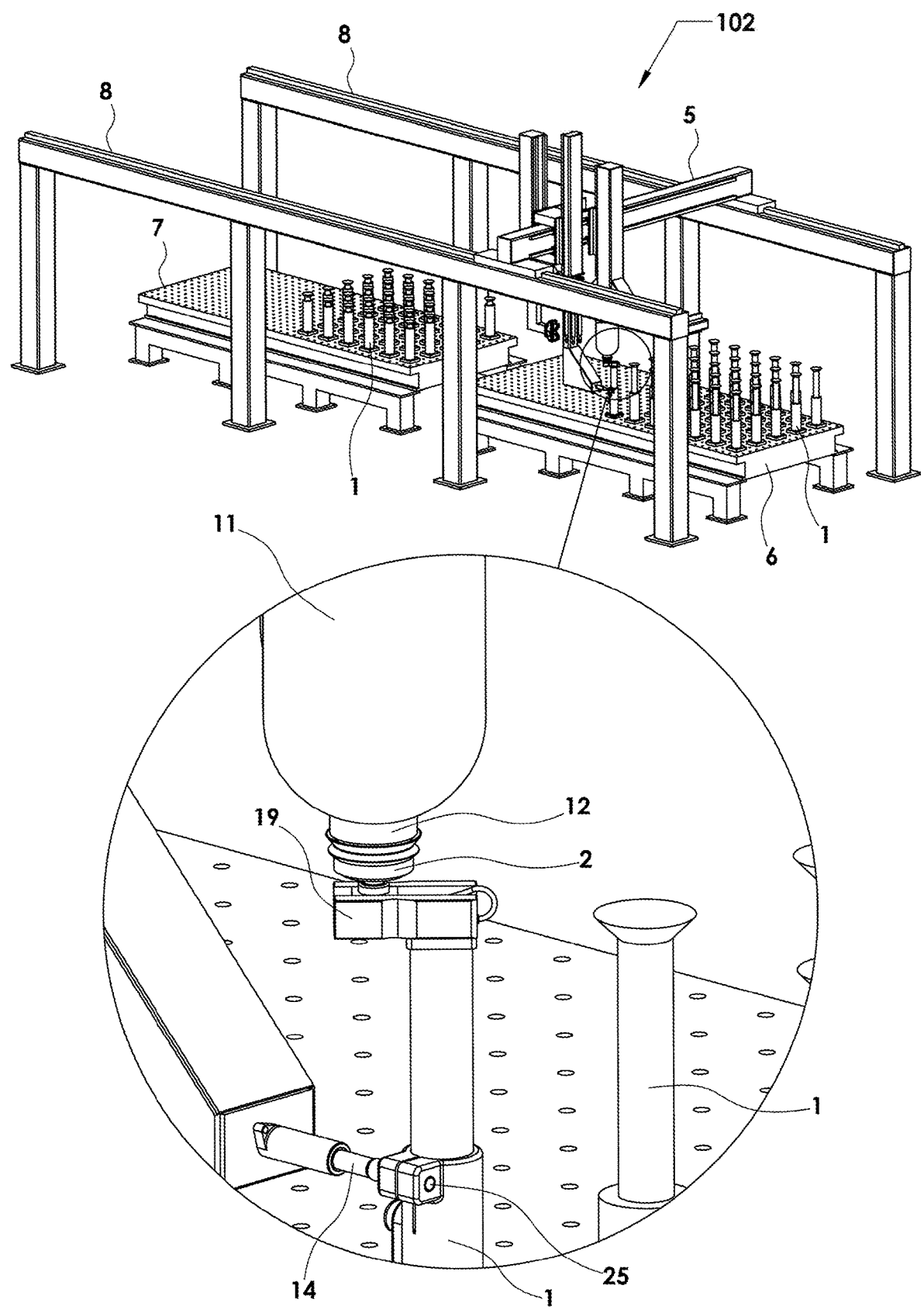
FIG. 44 is a perspective view with associated detail view showing rotation of the end effector assembly to provide for immobilization of the fixture element within the offset arm.

In FIG. 44, the fixture element 2 is being rotated by the end effector assembly 12 to immobilize the dovetail clamp block 20 as shown in FIG. 18. This process includes rotating the outer housing 11, and end effector assembly 12 while attached to the fixture element 2 in a tightening direction. This creates frictional clamping pressure between clamp disc 21 as shown in FIG. 18 and the offset arm 19.

Figure 45:
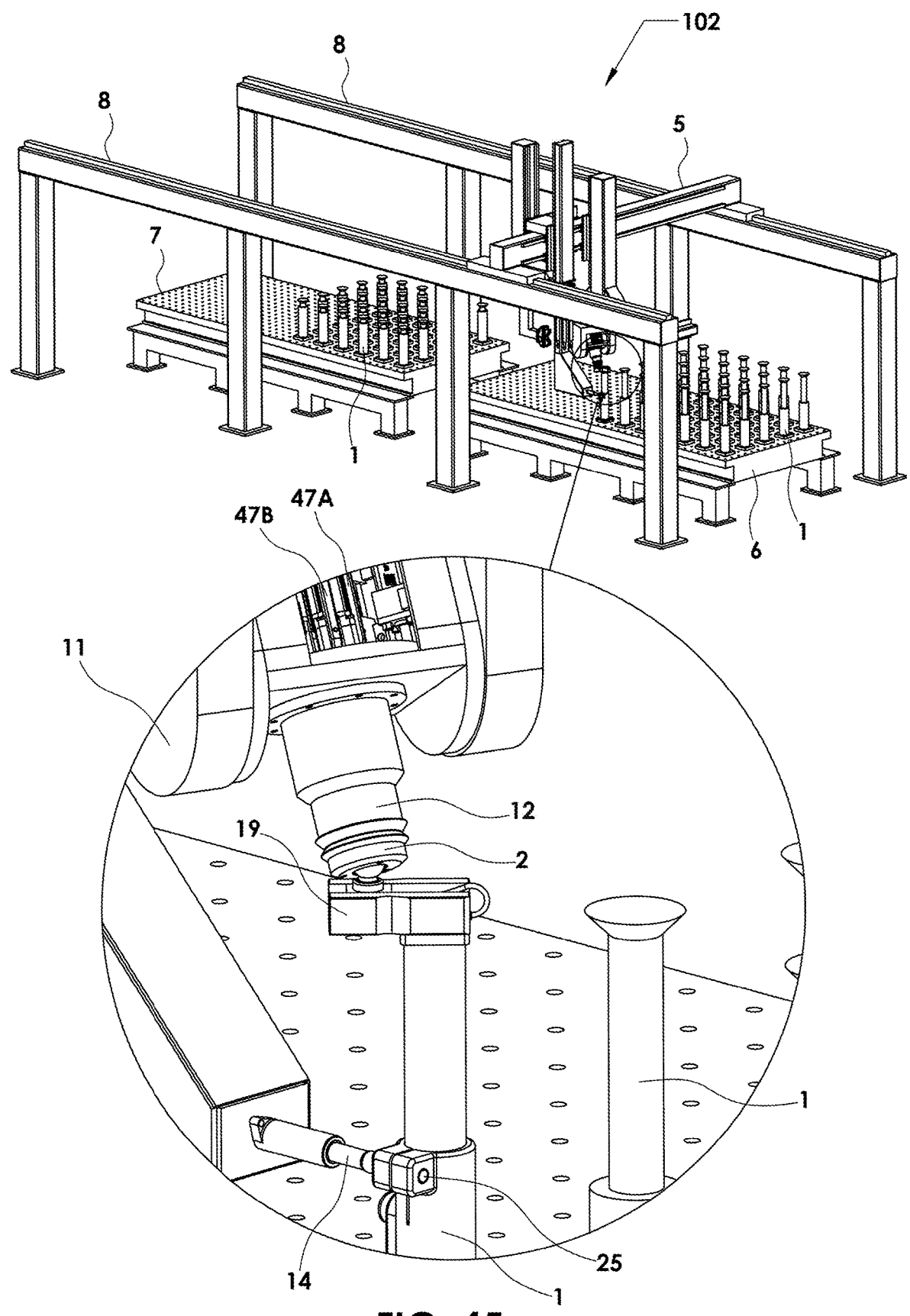
FIG. 45 is a perspective view with associated detail view showing the tilting of the end effector within the A and B axes.

In FIG. 45, the fixture element 2 is being rotated by the end effector assembly 12 to its final working position. The rotation of the fixture element 2 is mobilized by threadedly loosening the three adjustment clamp screws 30 with the three adjustment drivers 44 as shown in FIG. 30. The end effector assembly 12 is moved to the desired AB axis positions. The fixture element 2 is immobilized by tightening the adjustment clamp screws 30 with adjustment drivers 44 as shown in FIG. 30.

The end effector assembly 12 is then detached from the fixture element by loosening attachment screws 45 with the attachment drivers 43 as shown in FIG. 30.

Figure 46:
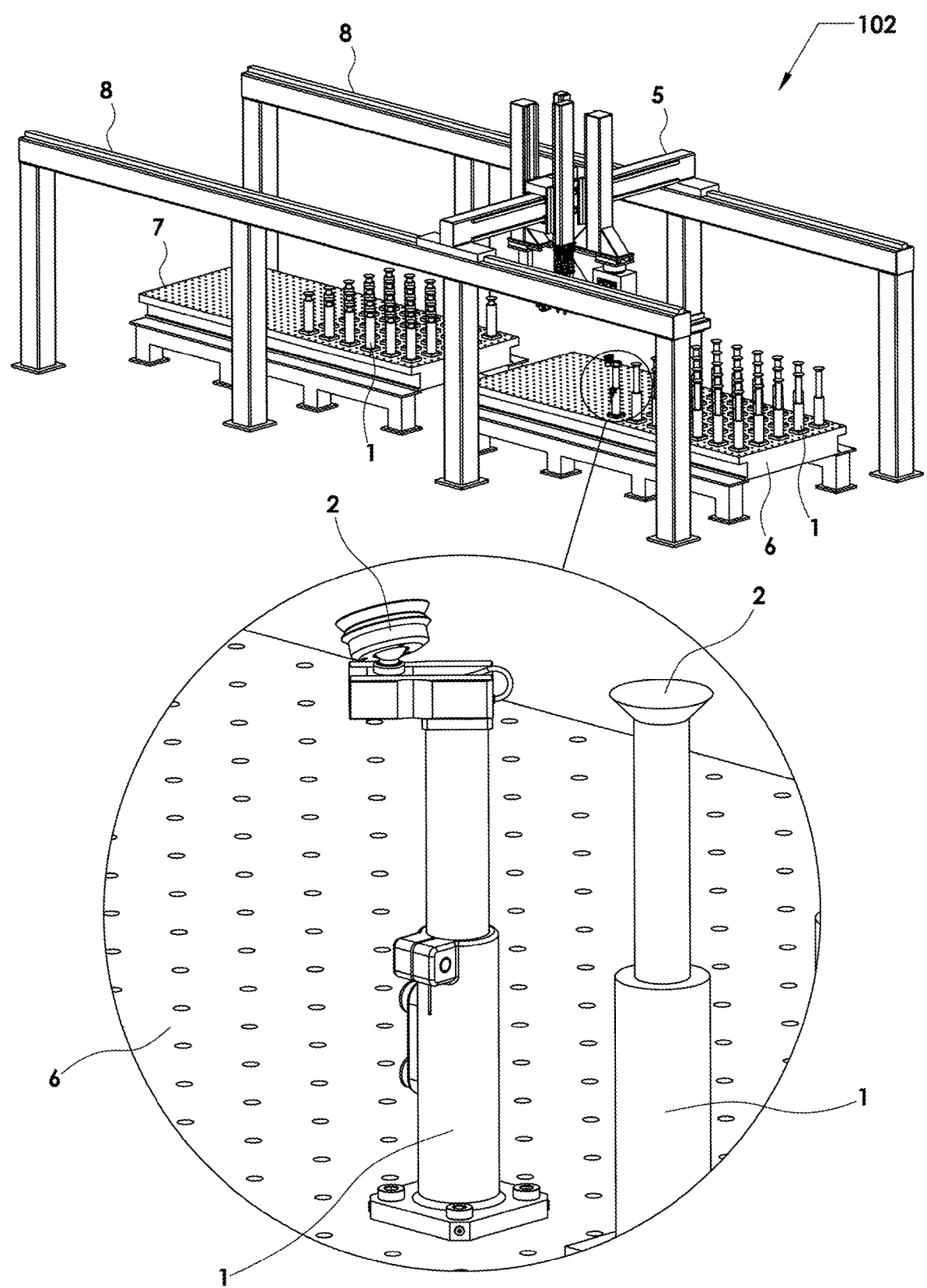
FIG. 46 is a perspective view with associated detail view showing workpiece support after adjustment to workpiece holding position has been completed.

In FIG. 46, workpiece support 1 is shown in its working position having been installed on the workpiece holding pallet 6. The process is then repeated until the required plurality of workpiece support assemblies have been installed on workpiece holding pallet 6 in required locations and adjusted to required positions to hold desired contoured workpiece.

Figure 47:
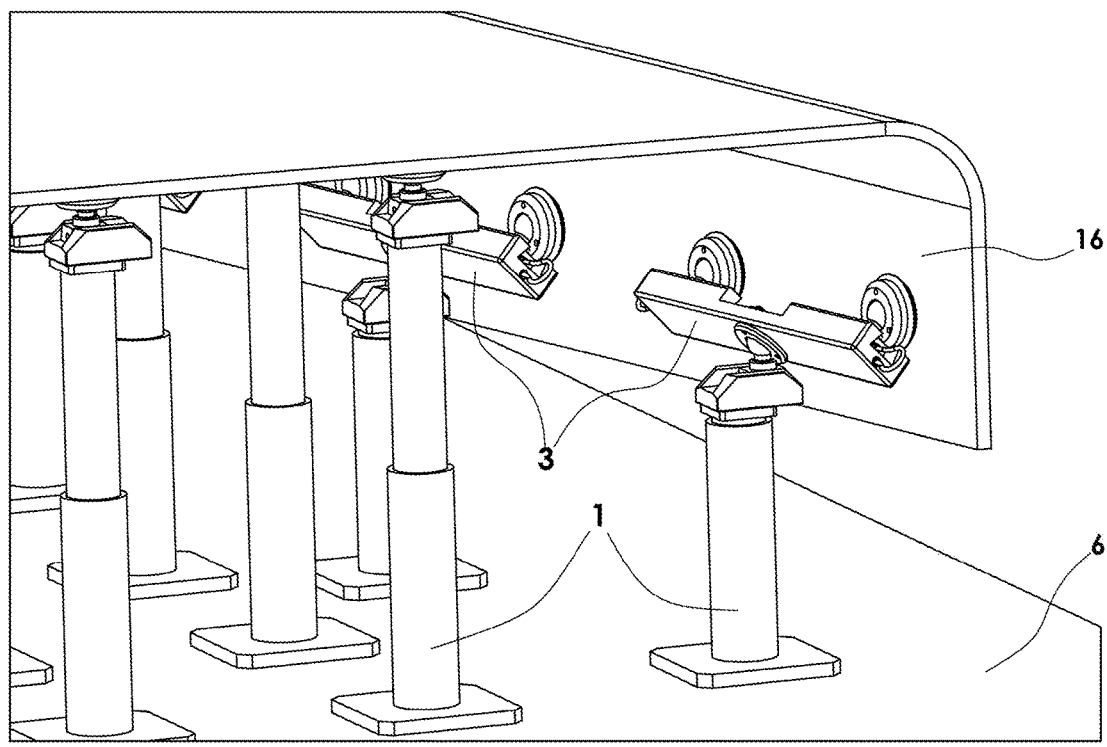
FIG. 47 is a perspective view of workpiece supports engaging a highly contoured section of a workpiece.

With reference to FIG. 47, a workpiece 16 having a deeply contoured concave region shown being engaged by a support 1 having a fixture element 3. As shown, the fixture element 3 can pivot to approximately ninety degrees relative to the longitudinal axis of the workpiece support 1. Likewise, in FIG. 48, a convex region of a workpiece 16 is being engaged similarly by fixture element 3.

Figure 49:
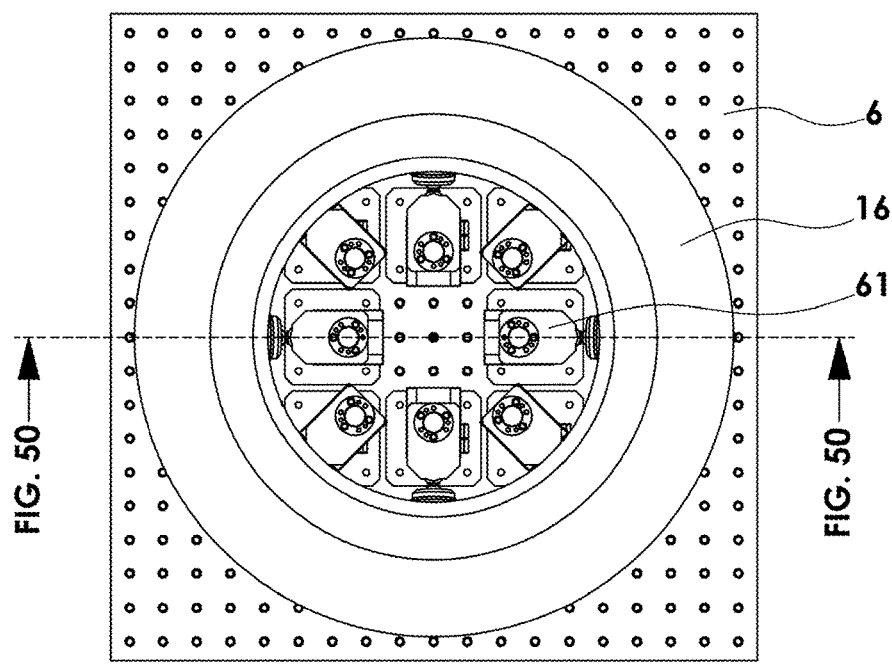
FIG. 49 is a top view of workpiece supports engaging a highly contoured section of a workpiece.
Figure 50:
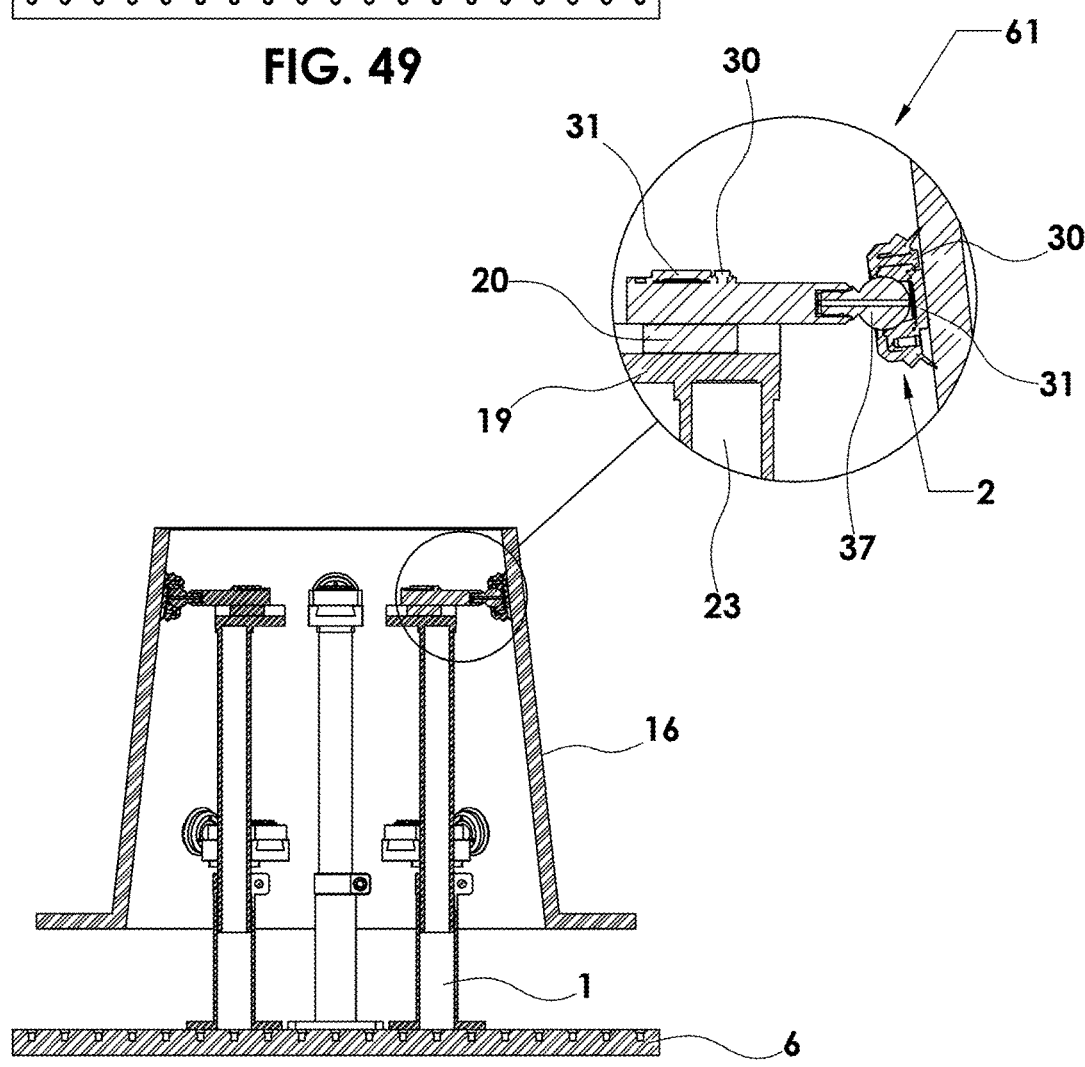
FIG. 50 is a sectional side view of workpiece supports having a transverse fixture, with a detail view included thereof.

In FIGS. 49 and 50, a workpiece support 1 having a transverse fixture element 61 is shown. The transverse fixture element 61 is similar to fixture element 2 (FIGS. 6-9), but is disposed in its default condition at a transverse angle to the longitudinal axis of the workpiece support 1. As a result, transverse fixture element 61 likewise comprises adjustment clamp screws 30 utilized to immobilize the fixture element 61 relative both to the support arm 23 and pivot ball 37. The transverse fixture element 61 can likewise traverse a dovetail groove.

In FIGS. 49 and 50, a deeply contoured fixture 16 is shown. This workpiece 16 has side walls set almost perpendicularly to the pallet 6. Transverse fixture elements 61 are helpful in maintaining support for such a workpiece 16.

Figure 48:
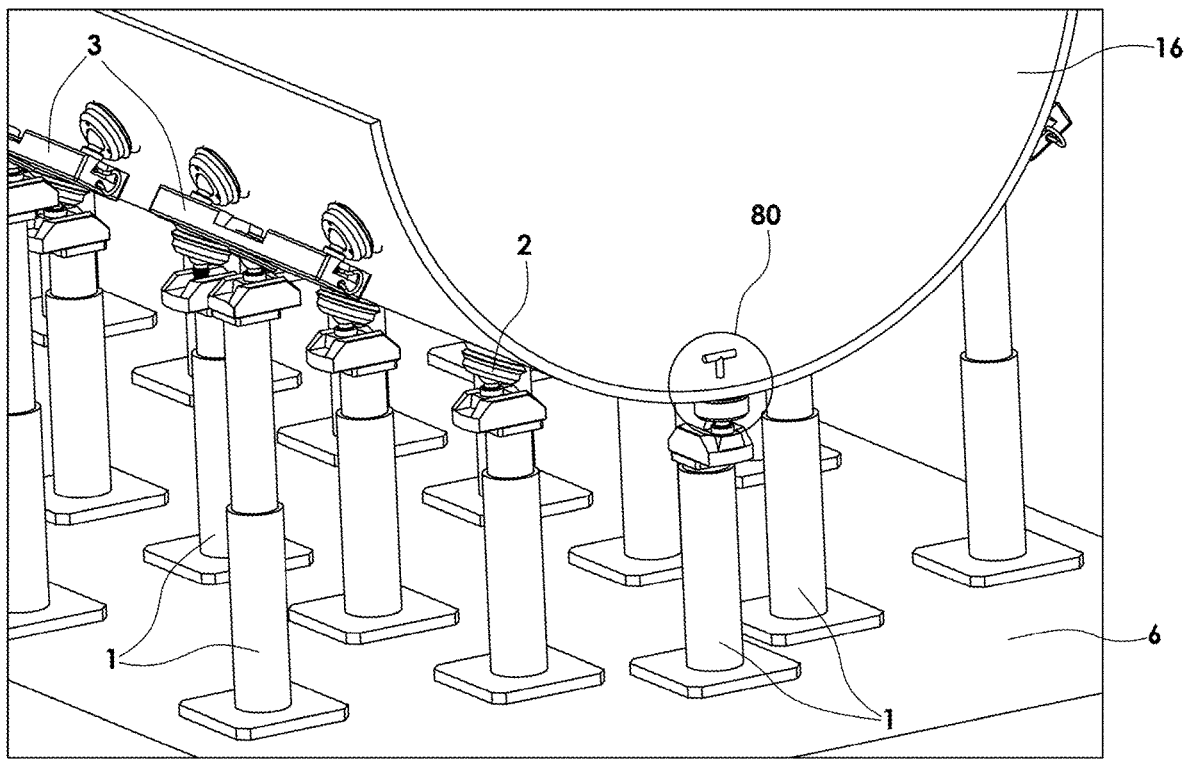
FIG. 48 is a perspective view of workpiece supports engaging a highly contoured section of a workpiece.
Figure 51:
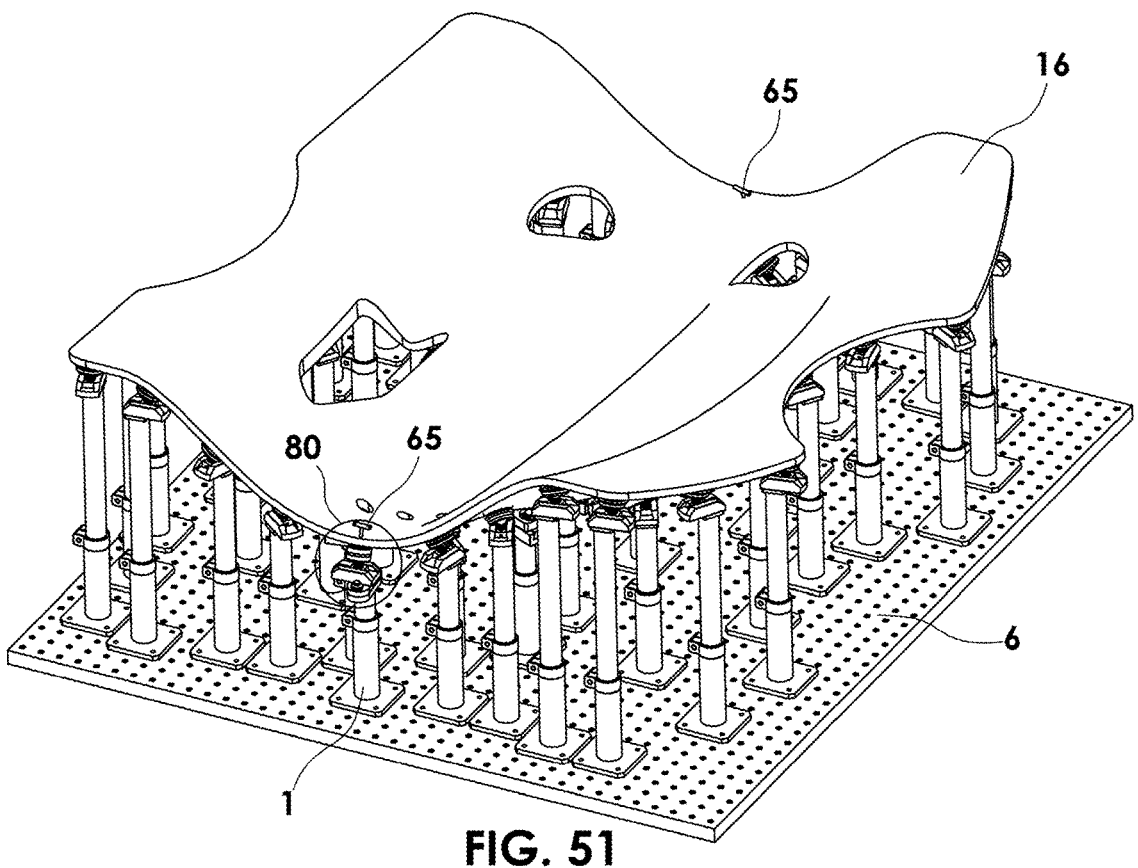
FIG. 51 is a perspective view of a highly contoured workpiece engaged by multiple varieties of fixtures.
Figure 52:
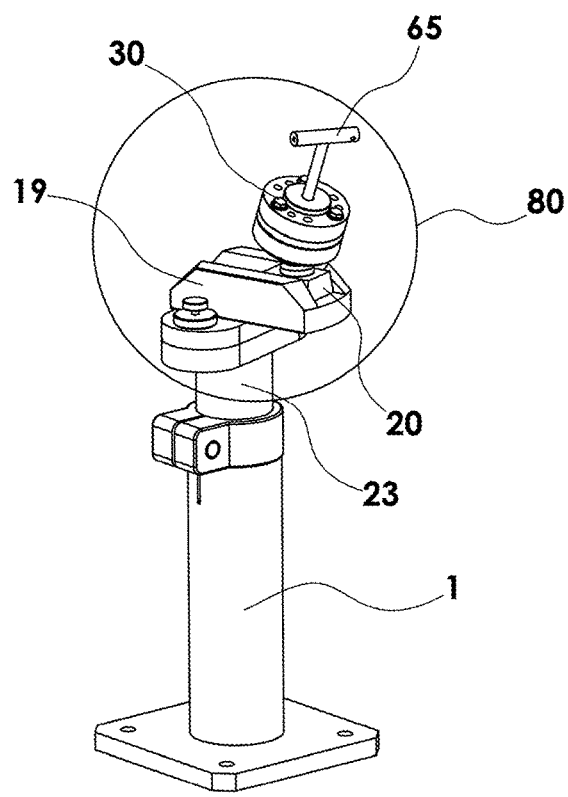
FIG. 52 is a perspective view of a locating fixture in use on a workpiece support.

With reference to FIG. 52, a locating fixture 80 is shown. The locating fixture 80 is similar to fixture 2, but utilizes a locating pin 65. The locating pin 65 may be placed through a corresponding hole in a workpiece 16. As shown in FIGS. 48 and 51, the locating fixture is engaging the workpiece 16 to establish its position. As with other fixtures 2, 3, 4, 61, the locating fixture 80 may be manipulated about five or six degrees of freedom by translation in a dovetail groove, manipulation of the support tube 23 relative to the pedestal, etc.

It may be advantageous, after locating the workpiece 16 and ensuring it is well-supported on the plurality of fixtures 2, 3, 4, 61 to remove the locating fixtures 80 and pins 65 prior to beginning machining operations.

Figure 53:
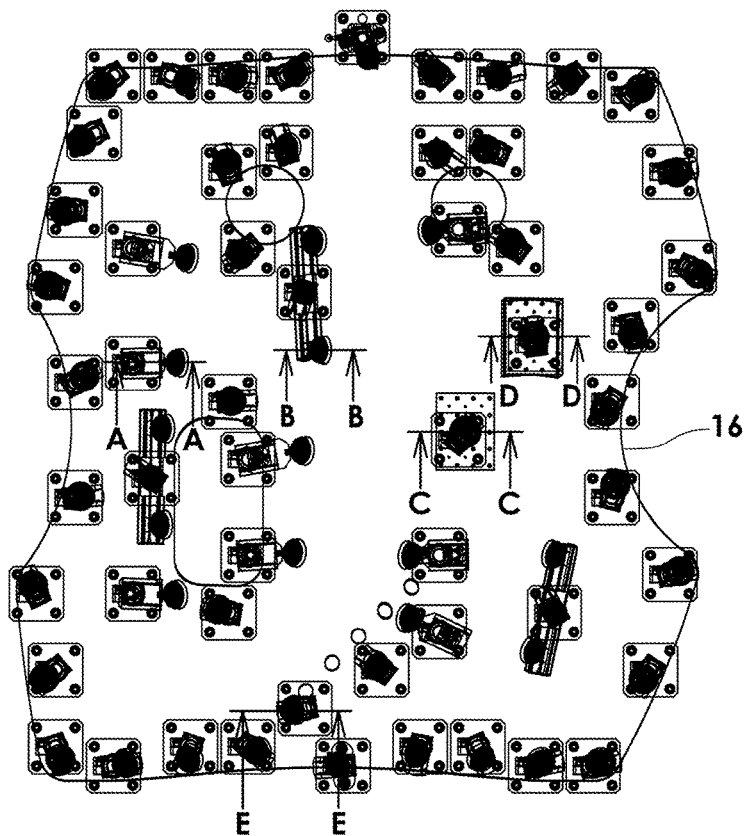
FIG. 53 is a top view of the fixture and system of FIG. 51, with the workpiece made transparent, excepting its outline, and the pallet removed, so that engagement between the workpiece and various fixture elements is shown.
Figure 54:
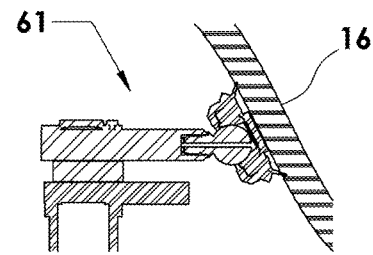
FIG. 54 is a view of section A-A from FIG. 53, with a transverse fixture element shown.
Figure 55:
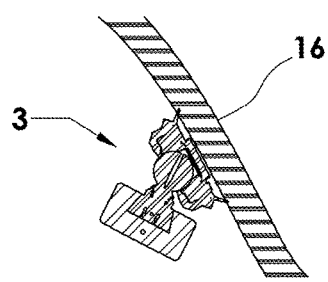
FIG. 55 is a view of section B-B from FIG. 53, with a dual member fixture element shown.

FIG. 51 and FIG. 53 show a plurality of fixtures 2, 3, 4, 61 in use on workpiece supports 1 on a deeply contoured, complex workpiece 16. FIG. 51 shows the assembly in perspective, while FIG. 53 is a top view, with the workpiece 16 made transparent so that different fixtures 2, 3, 4, 61 may be shown engaging the bottom surface of the workpiece. The pallet 6 is omitted from the view of FIG. 53 for clarity.

Figure 56:
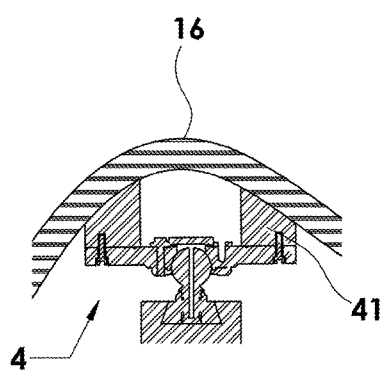
FIG. 56 is a view of section C-C from FIG. 53, with a contoured fixture element shown.
Figure 57:
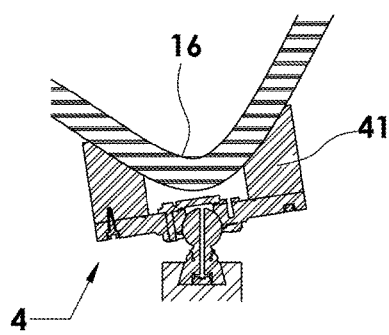
FIG. 57 is a view of section D-D from FIG. 53, with a contoured fixture element shown.
Figure 58:
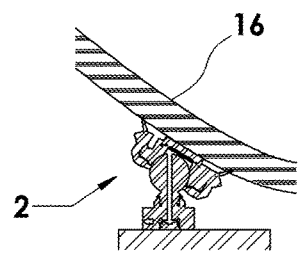
FIG. 58 is a view of section E-E from FIG. 53, with a fixture element shown.

Various cross-sectional views in FIGS. 54-58 show how the workpiece 16 is supported in FIG. 53. Each of fixtures 2, 3, 4, and 61 are being utilized. Additionally, FIG. 56 is a contoured fixture 4 engaging a concave section of the workpiece 16, while FIG. 57 is a contoured fixture 4 with a different engaging block 41 engaging a convex section of the workpiece.

Various modifications may be made to the disclosed embodiments without departing from the spirit of the invention described herein.

The invention claimed is:

1. A system comprising:
   a plurality of workpiece support assemblies, each comprising a pedestal and a fixture element, the fixture element being movable along and rotatable about each of three Cartesian axes relative to the pedestal when in a first condition and fixed in position relative to the pedestal when in a second condition; wherein at least one of the plurality of workpiece support assemblies comprises:
   a support tube having a first end and a second end, wherein the second end is disposed within the pedestal;
   an offset arm disposed at the first end of the support tube, the offset arm defining a dovetail groove therein; and
   a dovetail block slidingly received within the dovetail groove and carrying the fixture element; and
   a robotic assembly comprising:
   at least one torque transmission device capable of placing the fixture element in the first condition or the second condition;
   an end effector assembly engageable with the fixture element, wherein the end effector assembly is configured to rotate the fixture element about each of the three Cartesian axes and move the fixture element in each of the three Cartesian axes while engaged with the end effector assembly; and
   a robotic assembly system for driving translation and rotation of the end effector assembly.

2. The system of claim 1 wherein the at least one torque transmission devices is movable horizontally and in which the plurality of workpiece support assemblies each comprise a lock screw disposed on the pedestal, the lock screw having the first condition and the second condition, the first condition allowing vertical movement of the fixture element relative to the pedestal, and the second condition not allowing the vertical movement of the fixture element relative to the pedestal.

3. The system of claim 1 in which the at least one of the plurality of workpiece support assemblies further comprises:
   a ball joint interconnecting the dovetail block and the fixture element.

4. The system of claim 3 in which the second condition of the at least one of the plurality of workpiece support assemblies is defined by:
   the support tube fixed in position relative to the pedestal;
   the offset arm fixed in position relative to a centerline of the support tube;
   the dovetail block fixed in position within the dovetail groove of the offset arm; and
   the attitude of the fixture element is fixed relative to the dovetail block.

5. A system, comprising:
   a plurality of unpowered support assemblies, each support assembly having a fixture element having at least five selectable degrees of kinematic freedom; at least one of the plurality of support assemblies having:
      a pedestal;
      a support tube having a first end and a second end, wherein the second end is disposed within the pedestal;
      an offset arm disposed at the first end of the support tube, the offset arm defining a dovetail groove therein; and
      a dovetail block slidingly received within the dovetail groove and carrying the fixture element; and
   a robotic unit positionable in operative engagement with each of the plurality of support assemblies, the robotic unit carrying one or more installation elements collectively having at least five degrees of kinematic freedom, wherein the robotic unit is configured to rotate the fixture element of the support assembly about each of three Cartesian axes while engaged to the fixture element.

6. The system of claim 5 in which each support assembly is configured to selectively deprive its fixture element of any and all of its selectable degrees of kinematic freedom.

7. The system of claim 5 further comprising a workpiece supported on the plurality of support assemblies such that each fixture element closely conforms to the workpiece.

8. A kit, comprising:
   a plurality of unpowered support assemblies, at least one of the plurality of unpowered support assemblies comprising:
      a fixture element having at least six selectable degrees of kinematic freedom; and
      a pedestal;
   wherein the at least one of the plurality of unpowered support assemblies comprises:
      a support tube having a first end and a second end, wherein the second end is disposed within the pedestal;
      an offset arm disposed at the first end of the support tube, the offset arm defining a dovetail groove therein; and
      a dovetail block slidingly received within the dovetail groove and carrying the fixture element; and
   at least one base element configured to carry the plurality of unpowered support assemblies, the at least one base element having a plurality of installation sites, each installation site configured to receive one and only one support assembly; and
   a robotic unit positionable at each installation site of the at least one base element, the robotic unit carrying one or more installation elements collectively having at least six degrees of kinematic freedom, wherein the robot unit is configured to engage with the fixture element and rotate the fixture element about each of the three Cartesian axes as well as move the fixture element in each of the three Cartesian axes while engaged with the fixture element.

9. The kit of claim 8 in which the installation elements comprise at least one torque transmission device.

10. The kit of claim 8 in which the installation elements comprise at least one end effector assembly.

* * * * *